US006998942B2

(12) United States Patent
Kirihara et al.

(10) Patent No.: US 6,998,942 B2
(45) Date of Patent: Feb. 14, 2006

(54) THREE-DIMENSIONAL PERIODIC STRUCTURE, METHOD OF PRODUCING THE SAME, HIGH FREQUENCY ELEMENT, AND HIGH FREQUENCY APPARATUS

(75) Inventors: Soshu Kirihara, Mino (JP); Yoshinari Miyamoto, Ikeda (JP); Jun Hattori, Takatsuki (JP); Hiromu Tokudera, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 29 days.

(21) Appl. No.: 10/455,455

(22) Filed: Jun. 6, 2003

(65) Prior Publication Data

US 2003/0227360 A1    Dec. 11, 2003

(30) Foreign Application Priority Data

Jun. 7, 2002   (JP)   ............................. 2002-166836
Jun. 7, 2002   (JP)   ............................. 2002-166837

(51) Int. Cl.
    *H01P 3/00*    (2006.01)
(52) U.S. Cl. ...................................... 333/239; 333/238
(58) Field of Classification Search ............... 333/239, 333/204, 238, 246, 244; 716/5, 3, 11; 359/344; 343/795
    See application file for complete search history.

(56) References Cited

U.S. PATENT DOCUMENTS

| 4,302,706 A | * | 11/1981 | DuBois ................... 315/169.1 |
| 5,386,215 A | * | 1/1995 | Brown ....................... 343/795 |
| 5,532,643 A | * | 7/1996 | Kuffner et al. ............. 333/246 |
| 5,600,342 A | * | 2/1997 | Pikulski et al. ............. 343/909 |
| 5,600,483 A | * | 2/1997 | Fan et al. ................... 359/245 |
| 5,689,275 A |   | 11/1997 | Moore et al. |
| 5,739,796 A |   | 4/1998 | Jasper, Jr. et al. |
| 6,192,507 B1 | * | 2/2001 | Ruehli et al. ................... 716/5 |
| 6,621,384 B1 | * | 9/2003 | Handforth et al. .......... 333/238 |
| 6,640,034 B1 | * | 10/2003 | Charlton et al. ............ 385/122 |
| 6,720,848 B1 | * | 4/2004 | Okamura et al. ........... 333/204 |

FOREIGN PATENT DOCUMENTS

JP   2000-329953   11/2000

(Continued)

OTHER PUBLICATIONS

Kokubo et al., "Photonic crystal waveguides at millimeter and submillimeter wave", The Institute of Electronics, Information and Communication Engineers, Technical Report of IEICE (2001) No Month.

(Continued)

*Primary Examiner*—Peguy JeanPierre
*Assistant Examiner*—Joseph Lauture
(74) *Attorney, Agent, or Firm*—Dickstein, Shapiro, Morin & Oshinsky, LLP.

(57) ABSTRACT

A three-dimensional periodic structure, a method of producing the same, a high frequency element, and a high frequency apparatus that can be applied to a signal transmission path or a functional element in, for example, a compact functional element in a frequency range lower than optical frequencies, such as the microwave range are provided. The three-dimensional periodic structure includes a three-dimensional periodic structure component which includes two substances having different dielectric constants periodically distributed in three-dimensional axial directions, a dielectric layer having a predetermined thickness provided at the periphery thereof, and a conductor provided on external surfaces of the dielectric layer. A third material which is different from the two substances and having predetermined dimensions embedded into the three-dimensional periodic structure component can be provided. A transmission path integrally equipped with a conductor is constructed, which is used as a pipe of a waveguide.

24 Claims, 22 Drawing Sheets

FOREIGN PATENT DOCUMENTS

| | | |
|---|---|---|
| JP | 2000-341031 | 12/2000 |
| JP | 2001-074954 | 3/2001 |
| JP | 2001-215351 | 8/2001 |
| JP | 2001-237615 | 8/2001 |
| JP | 2001-237617 | 8/2001 |
| JP | 2002-84109 | 3/2002 |
| JP | 2003-69312 | 3/2003 |
| WO | WO 92/15124 | 9/1992 |
| WO | WO 95/30917 | 11/1995 |
| WO | WO 98/15858 | 4/1998 |
| WO | WO 98/26316 | 6/1998 |

OTHER PUBLICATIONS

Copy of Japanese Examination Report dated Jun. 7, 2005 (and English translation of same).

* cited by examiner

THREE-DIMENSIONAL PERIODIC STRUCTURE, METHOD OF PRODUCING THE SAME, HIGH FREQUENCY ELEMENT, AND HIGH FREQUENCY APPARATUS

BACKGROUND OF THE INVENTION

1. Field of the Invention

The present invention relates to a three-dimensional periodic structure, a method of producing the same, a high frequency element, and a high frequency apparatus that can be used in electronic parts.

2. Description of the Related Art

A periodic potential distribution in a solid crystal due to the nuclei exhibits interference of an electron wave having a wavelength that corresponds to the lattice constant. For example, when the wavelength of the electron wave is very close to the potential period of the crystal, reflection occurs by three-dimensional diffraction (Bragg diffraction). This phenomenon prevents the passage of electrons in a specific energy range. Thus, an electronic band gap, which is utilized in semiconductor devices, is formed.

Similarly, a three-dimensional structure having a periodically changing refractive index or dielectric constant exhibits interference of electromagnetic waves, thus blocking the electromagnetic waves in a specific frequency range. In this case, the forbidden band is called a photonic band gap and the three-dimensional structure is called a photonic crystal.

The effect of such a photonic crystal has been considered for use to provide a cut-off filter that prevents penetration of electromagnetic waves within a predetermined frequency band, or to provide a waveguide or a resonator by introducing a nonuniform part that disturbs the frequency to trap light or electromagnetic waves into the periodic structure. Applications such as ultra-low threshold lasers or electromagnetic highly directional antennas are also considered.

In general, in a photonic crystal, two types of standing waves are formed when the electromagnetic waves produce Bragg diffraction. FIG. 1 shows the two types of standing waves. Standing wave A has high energy at a low dielectric constant area of the wave vibration while standing wave B has high energy at a high dielectric constant area of the wave vibration. Waves having energy between the standing waves that split into two different modes cannot exist in the crystal, thereby producing the band gap. In order to broaden the band gap, the energy difference between the two standing waves is increased. This can be achieved by strengthening the contrast between the dielectric constants of two media to a high degree, or increasing the volume ratio of the media having the high dielectric constant.

The photonic crystal has a one-, two-, or three-dimensional structure. A three-dimensional structure is needed for a photonic band gap.

In order to provide a three-dimensional structure, Japanese Unexamined Patent Application Publication No. 10-335758 discloses "A three-dimensional periodic structure, a method of producing the same, and method of producing a film", Japanese Unexamined Patent Application Publication No. 2000-329953 discloses "A photonic crystal and a method of producing the same", Japanese Unexamined Patent Application Publication No. 2000-341031 discloses "A three-dimensional periodic structure and a method of producing the same", Japanese Unexamined Patent Application Publication No. 2001-74954 discloses "A three-dimensional photonic crystal structure and a method of producing the same", Japanese Unexamined Patent Application Publication No. 2001-215351 discloses "A periodic structure element having multiple dielectric constants, a method of designing the same, and a method of producing the same", Japanese Unexamined Patent Application Publication No. 2000-158542 discloses "A structure, a multilayer structure, a method of producing the same, and an apparatus therefor", and Japanese Unexamined Patent Application Publication No. 2000-258645 discloses "A three-dimensional periodic structure, a two dimensional structure, and a method of producing them".

These three-dimensional periodic structures have been invented for application to various devices utilizing its photonic band gap. However, they do not suggest an electrode arrangement of the three-dimensional periodic structure. Also, they do not suggest applications for a waveguide in the microwave or millimeter wave range. When these three-dimensional periodic structures are used to construct a transmission path, the path becomes undesirably large.

SUMMARY OF THE INVENTION

An object of the present invention is to provide a three-dimensional periodic structure, a method of producing the same, a high frequency element, and a high frequency apparatus that can be applied to a compact signal transmission path or a functional element in, for example, the microwave range.

In one aspect, a three-dimensional periodic structure of the present invention comprises two substances having different dielectric constants periodically distributed in three-dimensional axial directions in three-dimensional space, a coated layer having a predetermined thickness and made of one of the two substances, the coated layers being provided at the periphery of the three-dimensional space, and a conductive film provided on an external surface of the coated layer. At the periphery of the three-dimensional space, conductors can be integrated to significantly decrease required numbers of parts, and make the structure compact.

Space having predetermined dimensions and constituted by one of the two substances is provided in the three-dimensional space of the periodic structure. Such a three-dimensional periodic structure can easily be periodically broken locally. By suitably selecting the shape, size and position of the space, spurious-mode frequencies, blocking frequency bands, the bandwidth, the attenuation and the like can be adjusted.

According to the present invention, a resonator comprises the three-dimensional periodic structure of the present invention and a coupling part which is coupled to an electromagnetic field in a resonance mode in the space surrounded by the conductive film of the three-dimensional periodic structure. A compact and lightweight resonator or filter can thus be easily provided.

According to the present invention, a transmission path comprises the three-dimensional periodic structure of the present invention and a coupling part which is coupled to an electromagnetic field in a transmission mode in the space surrounded by the conductive film of the three-dimensional periodic structure. The transmission path having a filter function can thereby be provided.

According to the present invention, an antenna comprises the three-dimensional periodic structure of the present invention and a window through which electromagnetic waves penetrate provided on the conductive film of the three-dimensional periodic structure. The antenna having a filter function can thus be provided.

In the antenna, the three-dimensional periodic structure has different crystal periods in predetermined three-dimensional directions, and the windows are provided thereon in the predetermined three-dimensional directions with the different crystal periods. A single antenna having various radiation characteristic can thereby be provided without any special element.

According to the present invention, a branching filter comprises the antenna of the present invention and a transmission path provided at the window of the antenna. The branching filter can be made compact.

According to the present invention, an isolator comprises a signal transmission path including the transmission path of the present invention. An isolator having a filter function is thereby provided.

According to the present invention, a coupler comprises a signal transmission path including the transmission path of the present invention. The coupler having a filter function can thus be provided.

According to the present invention, a high frequency apparatus comprises any one of the resonator, the transmission path, the antenna, the branching filter, the isolator and the coupler as described above.

In another aspect, a method of producing a three-dimensional periodic structure by stereolithography method of the present invention comprises repeating the step of irradiating light onto a light-hardenable resin in each layer cross-sectional pattern to be formed to form the three-dimensional periodic structure of the present invention where either of the two substances is distributed, and forming the conductive film of the present invention by electroless plating. A three-dimensional periodic structure having conductors integrally at the periphery can be easily produced.

In another aspect, a three-dimensional periodic structure of the present invention comprises two substances having different dielectric constants periodically distributed in three-dimensional axial directions, the two substances occupying a three-dimensional space with predetermined external dimensions, and a material having predetermined dimensions and comprising a different substance from the two substances embedded into the three-dimensional space. When such three-dimensional periodic structure is applied to a frequency range lower than optical frequencies, such as the microwave range, the three-dimensional periodic structure does not become large-sized in contrast to where two substances having different dielectric constants are simply periodically distributed in a three-dimensional axial direction. Thus, the three-dimensional periodic structure of the present invention can be applied to a functional element in a frequency range lower than optical frequencies.

In the three-dimensional periodic structure of the present invention, one of the two substances can be air arranged as holes in a diamond crystal lattice structure, and wherein the material comprising the substance different from the two substances is provided in a plurality of the air holes. The material can be easily positioned.

In yet another aspect, a three-dimensional periodic structure of the present invention comprises two substances having different dielectric constants simply periodically distributed in three-dimensional axial directions, the two substances occupying a three-dimensional space with predetermined external dimensions, and a space having predetermined dimensions in which one of the two substances is filled, provided in the three-dimensional space. When such three-dimensional periodic structure is applied to a frequency range lower than optical frequencies, such as the microwave range, the three-dimensional periodic structure does not become large-sized in contrast to where two substances having different dielectric constants periodically distributed in a three-dimensional axial direction. Thus, the three-dimensional periodic structure of the present invention can be applied to a functional element in a frequency range lower than optical frequencies.

In the three-dimensional periodic structure of the present invention, the three-dimensional periodic structure has changed periods along predetermined three-dimensional axial directions. The number of designing parameters is increased as compared with the case where the period is constant, resulting in a highly functional three-dimensional periodic structure.

According to the present invention, a transmission path comprising the three-dimensional periodic structure provided within a waveguide is provided. The transmission path can provide a filter action to signals, for example, within the microwave range.

According to the present invention, a transmission path comprising the three-dimensional periodic structure provided on one surface or both surfaces of a substrate which constitutes a part of the transmission path is provided. The transmission path can provide a filter action to signals, for example, within the microwave range.

In the transmission path, the substrate comprises a transmission line made of a conductive film. The transmission path can have both characteristics as the transmission path comprising the conductive film and the substrate, and electrical characteristics provided by the three-dimensional periodic structure.

In the transmission path, the substrate can have a multilayer structure comprising circuit elements, including a capacitor, an inductor, and an interlayer connection. The transmission path can be multifunctional having the electrical characteristics of the circuits on the substrate.

According to the present invention, a filter comprising the transmission path for utilizing the transmission characteristics thereof is provided. The filter can have the transmission characteristics of the transmission path.

DESCRIPTION OF THE PREFERRED EMBODIMENTS

Referring to FIGS. 2 to 5, a transmission path according to a first embodiment of the present invention will be described.

Figure 1:
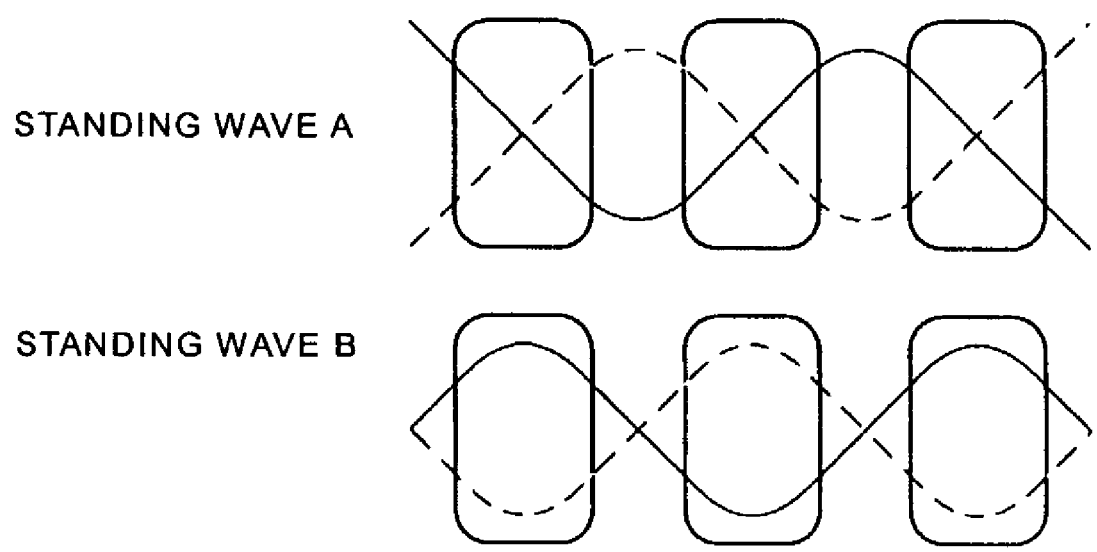
FIG. 1 is a diagram showing two standing waves when substances having different dielectric constants are periodically distributed.
Figure 2A:
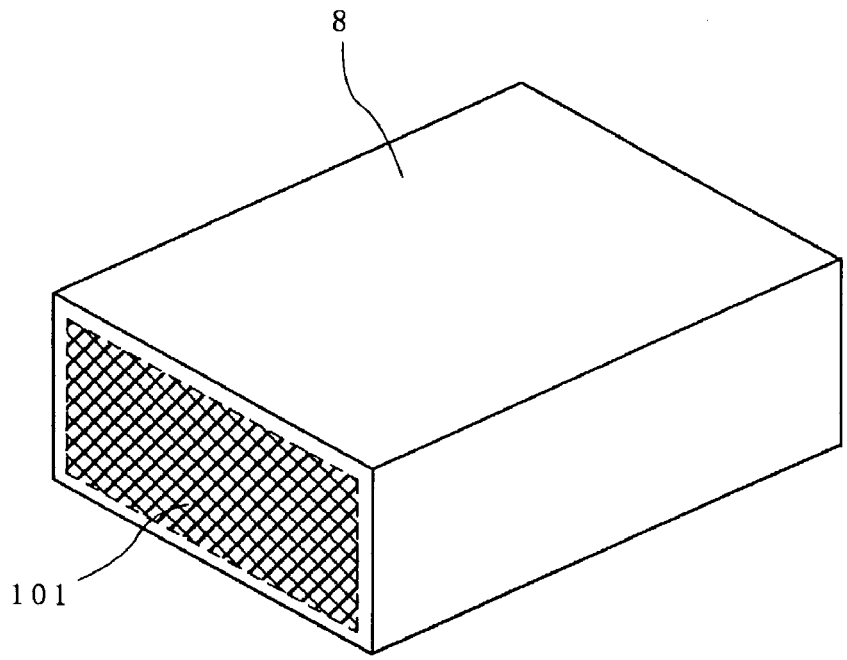
FIGS. 2A and 2B are a perspective view and a sectional view of a transmission path according to a first embodiment of the present invention.
Figure 2B:
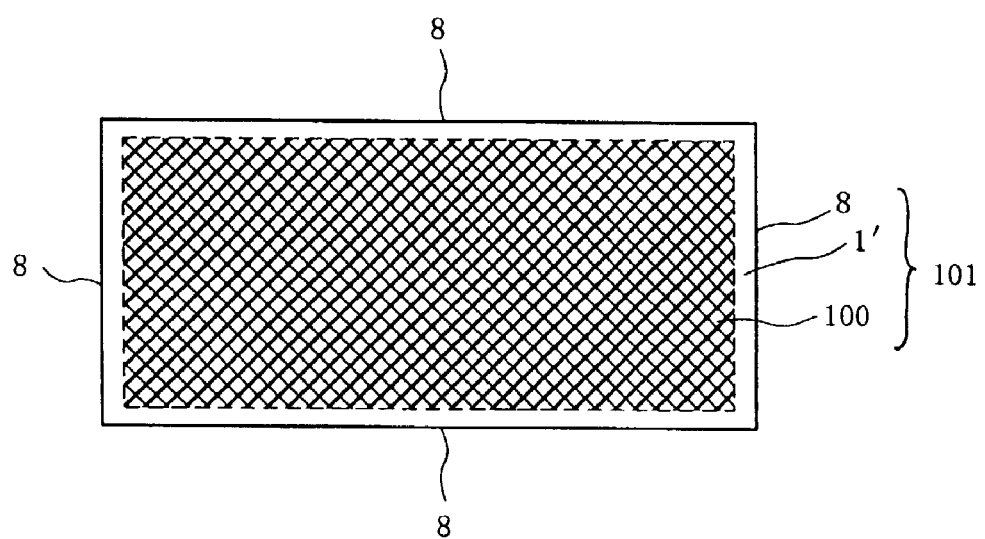

FIG. 2A is a perspective view of the transmission path. FIG. 2B is a sectional view orthogonal to the signal transmission direction.

A three-dimensional periodic structure component 100 in which a dielectric layer 1' and air holes are periodically distributed in the three-dimensional axes is shown. The dielectric layer 1' having a predetermined thickness is provided around the three-dimensional periodic structure component 100. The dielectric layer 1' includes no air holes, and an external conductor 8 is formed on the surface of the dielectric layer 1' so that the external conductor 8 covers the surfaces of the dielectric layer 1' extending in the longitudinal direction. The three-dimensional periodic structure 101 is constituted by the three-dimensional periodic structure component 100, the dielectric layer 1', and the external conductor 8.

The three-dimensional periodic structure component 100 acts as a photonic crystal. In order for the photonic crystal to develop a sufficient electromagnetic-wave reflectivity, it is necessary to form a wide band gap in all crystal directions. An ideal crystal structure is a three-dimensional diamond structure. In the diamond structure, a unit lattice includes eight lattice points; four of which form an independent face centered cubic lattice, and one lattice is located at a position so that the lattice is moved ¼ of the length of the other lattice along a steric diagonal line.

A diamond-structure photonic crystal is a crystal in which spherical dielectrics are located at the lattice points of the diamond structure, that is, a crystal that simulates atomic bonds of the diamond structure by combining dielectric columns.

In the three-dimensional periodic structure component 100 shown in FIGS. 2A and 2B, air holes in the diamond-type lattice structure are periodically distributed in a resin. Such a structure can be referred to as a reverse diamond structure. The ratio of the diameter to the length in columns in the lattice shown is 2:3 (aspect ratio 1.5). The lattice constant is 10 mm.

The three-dimensional periodic structure component 100 thus constructed attenuates a predetermined frequency band by its photonic band gap. The three-dimensional periodic structure component 100 is constructed in advance so that the frequency band to be blocked is matched with the frequency band attenuated by the photonic band gap, whereby the three-dimensional periodic structure 101 acts as a transmitting path that transmits only the frequency band desired to be transmitted, and blocks unwanted frequency components.

Figure 3A:
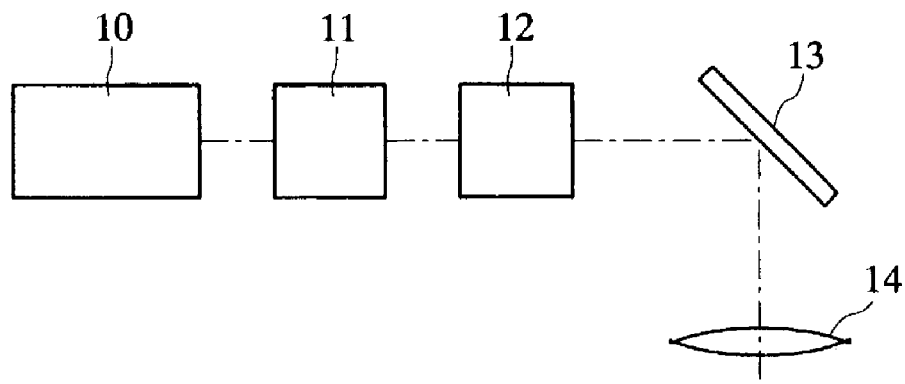
FIG. 3A is a diagram showing the structure of a stereo lithography apparatus.

FIG. 3A shows a stereolithography apparatus for producing a main part of the three-dimensional periodic structure 101 shown in FIG. 2A. A container 15 filled with an epoxy-based light-hardenable resin 18 that can be hardened by ultraviolet rays, an elevator table 16 that moves upward and downward within the container 15, an object 19 formed on the top of the elevator table 16, and a squeegee 17 for coating the light-hardenable resin 18 on the top surface of the object 19 to a predetermined film thickness are shown.

Also, a laser diode 10, a harmonic generating element (LBO) 11 for changing the wavelength of the laser light from the laser diode 10 to produce ultraviolet rays, an acousto-optical element (AOM) 12 functioning as a wavelength selecting element, a scanning mirror 13, and fθ lens 14 are shown. Thus, an optical system is configured.

A process sequence for producing the photonic crystal using the stereolithography apparatus is described below.

First, the elevator table 16 is lowered from the liquid surface of the light-hardening resin 18 to a predetermined depth. The squeegee 17 is moved along the liquid surface to form a light-hardenable resin film having a thickness of about 150 µm on the surface of the elevator table 16. The liquid surface is then irradiated with ultraviolet rays having a wavelength of 355 nm with a spot diameter of 50 µm and an output power of 110 mW by the optical system. The scanning mirror 13 is controlled to modulate the laser diode 10 so that the laser light is irradiated to an area where the light-hardening resin 18 is to be hardened, but is not irradiated to other areas.

A spherical hardened phase having a diameter of 100 µm is formed by a polymerization reaction on the liquid surface of the light-hardenable resin 18 irradiated with the laser beam. When the laser beam is scanned at a speed of 90 m/s, a hardened phase having a thickness of 150 µm is formed. The object 19 is formed corresponding to a first layer cross-sectional pattern by raster scanning the laser beam.

Then, the elevator table 16 is lowered by about 200 µm. The squeegee 17 is moved to form a light-hardenable resin film having a thickness of about 200 µm on the surface of the object 19.

Thereafter, a second layer cross-sectional pattern is formed on the first layer by scanning and modulating the laser beam similarly to the first layer. The first and second layers adhere by polymerization hardening. Third and subsequent layers are formed in the same manner. By repeating this processing, the object 19 is constructed.

Figure 4A:
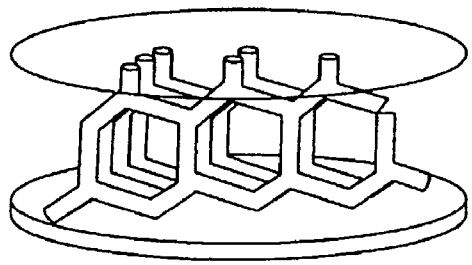
FIGS. 4 to 4C are diagrams each showing an object being formed by a stereo lithography apparatus.
Figure 4B:
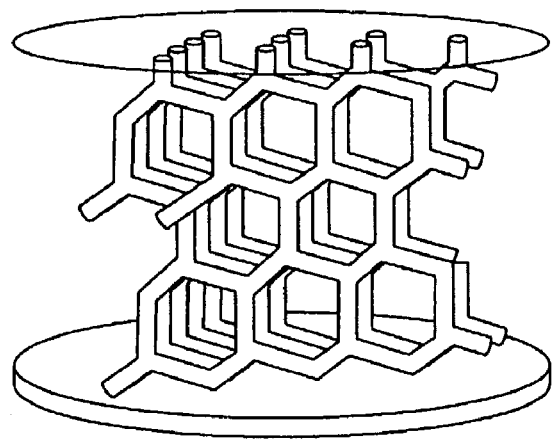
Figure 4C:
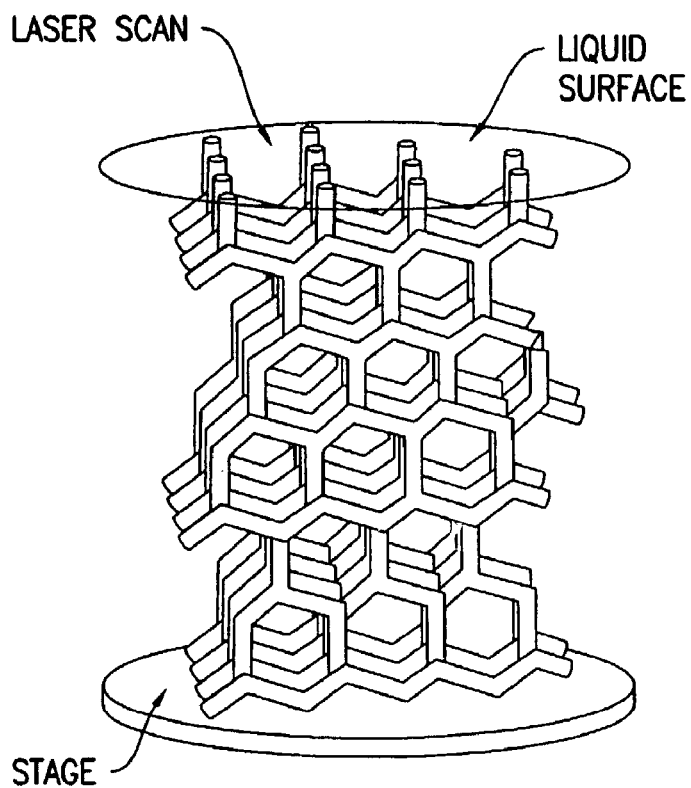

FIGS. 4A to 4C are perspective diagrams each showing an object in each of the steps for forming a number of layers. For simplicity, parts that are not hardened with laser beam irradiation, i.e., the hole patterns, are shown. FIG. 4A shows substantially only one unit in the <111> crystal axis direction of the diamond structure. FIG. 4B shows substantially four units. FIG. 4C shows several units.

In the apparatus shown in FIG. 3A, a CAD/CAM process is used to harden the light-hardenable resin 18 in the predetermined cross-sectional patterns at the liquid surface of the light-hardenable resin 18. Specifically, the patterns shown in FIGS. 4A to 4C are designed in advance by a CAD system capable of handling three-dimensional data. The three-dimensional data is converted into STL (stereolithography) data. The STL data is converted into sets of two-dimensional data at predetermined positions using slicing software. Finally, data for modulating the laser diode when the laser beam is raster scanned is created with the two-dimensional data. Based on the thus-prepared data, the laser beam is scanned, and the laser diode is modulated.

Figure 5A:
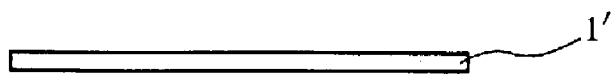
FIGS. 5A to 5D show process steps of producing a three-dimensional periodic structure by stereo lithography.
Figure 5B:
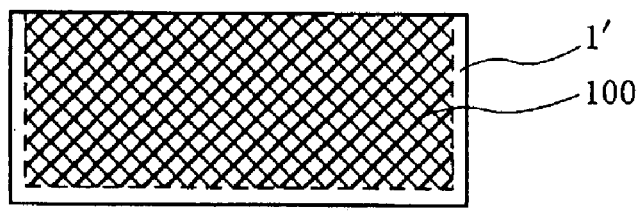
Figure 5C:
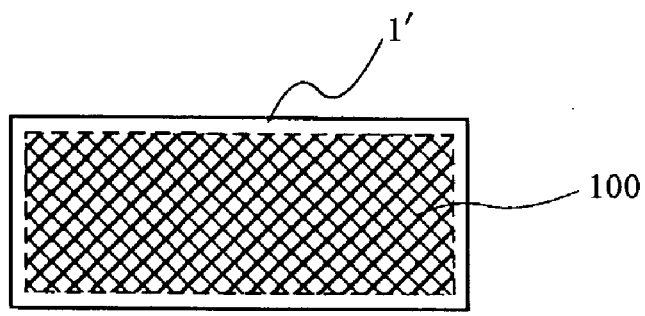
Figure 5D:
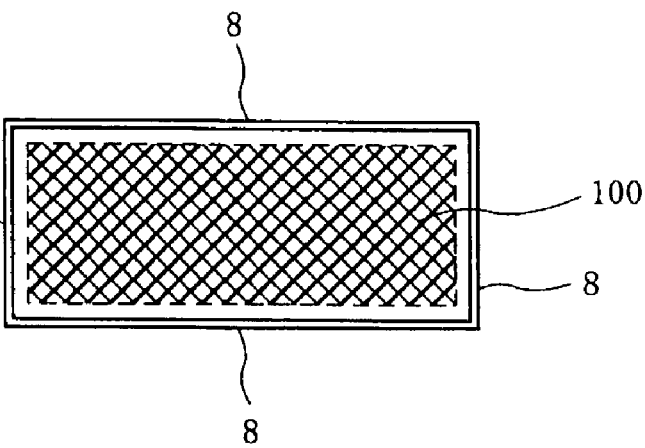

FIGS. 5A to 5D show process steps of producing a three-dimensional periodic structure 101 by the aforementioned stereolithography apparatus. As shown in FIG. 5A, the dielectric layer 1' is produced by stereolithography so that it has a predetermined thickness. Then, the stereolithography is further patterned so that the three-dimensional periodic structure component 100 is formed within the dielectric layer 1' having the predetermined thickness. Thereafter, the surface of the dielectric layer 1' is coated with the external conductor 8 by electroless plating, thereby providing the three-dimensional periodic structure 101 as shown in FIGS. 2A and 2B.

Now, referring to FIG. 6 and FIGS. 7A and 7B, a transmission path according to a second embodiment of the present invention will be described.

Figure 6:
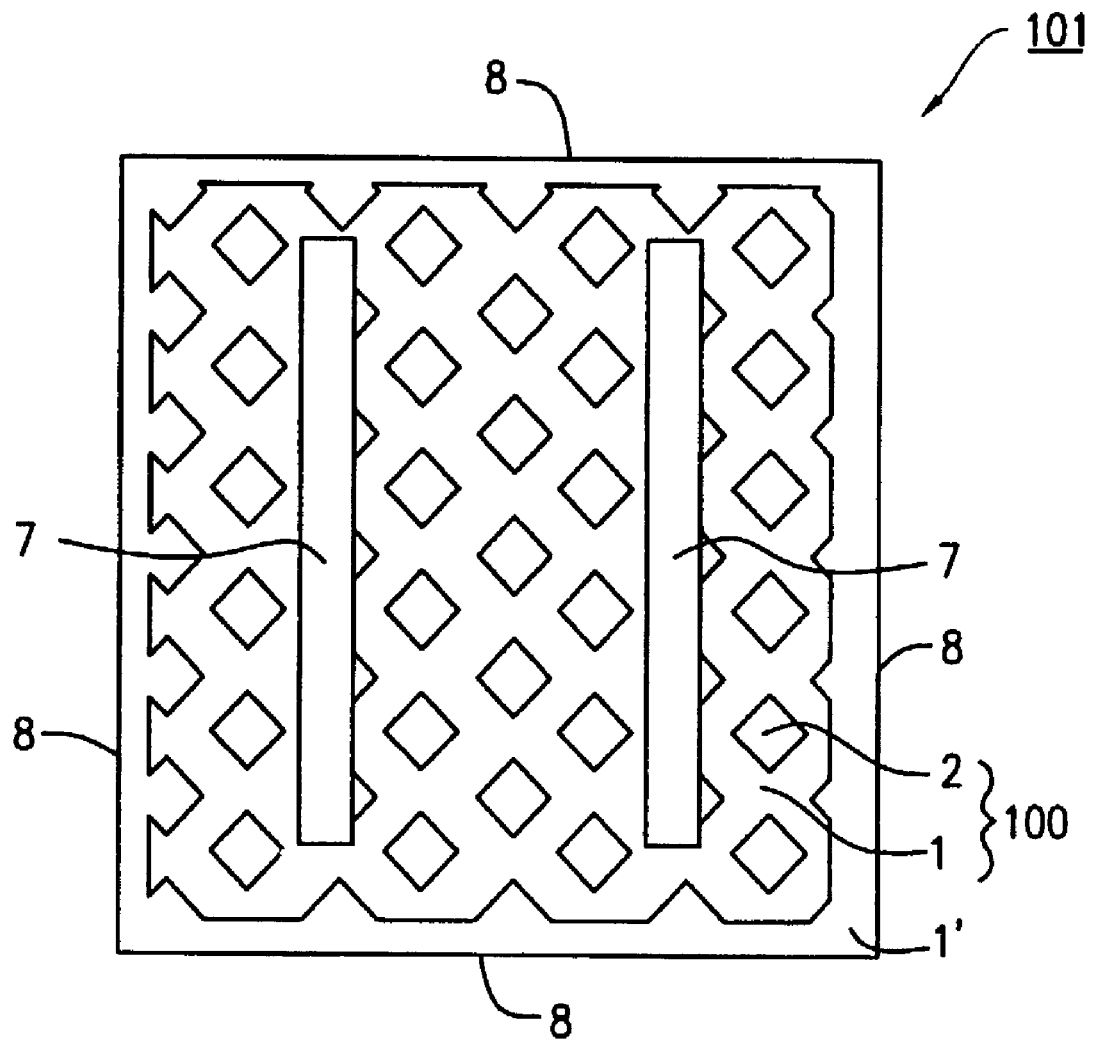
FIG. 6 is a sectional view of a transmission path according to a second embodiment of the present invention.

FIG. 6 is a sectional view orthogonal to a signal transmission direction. A dielectric 1 and air holes 2 are shown. The dielectric 1 and the air holes 2 periodically distributed in the three-dimensional axial directions together constitute a three-dimensional periodic structure component 100. Voids 7 extending in the signal transmission direction are formed at predetermined positions, which are different from those shown in FIGS. 2A and 2B. A dielectric layer 1' with a predetermined thickness having no air holes is formed around the three-dimensional periodic structure component 100, and an external conductor 8 is formed around layer 1'.

By providing the voids 7 within the three-dimensional periodic structure 101, the effect of the crystal structure of the three-dimensional periodic structure 101 on electromagnetic waves to be transmitted changes. By suitably selecting the shape, the size and the position of each void 7, spurious-mode frequencies can be adjusted. Also, the blocking frequency band, the bandwidth, the attenuation and the like can be adjusted to some degree.

Figure 7A:
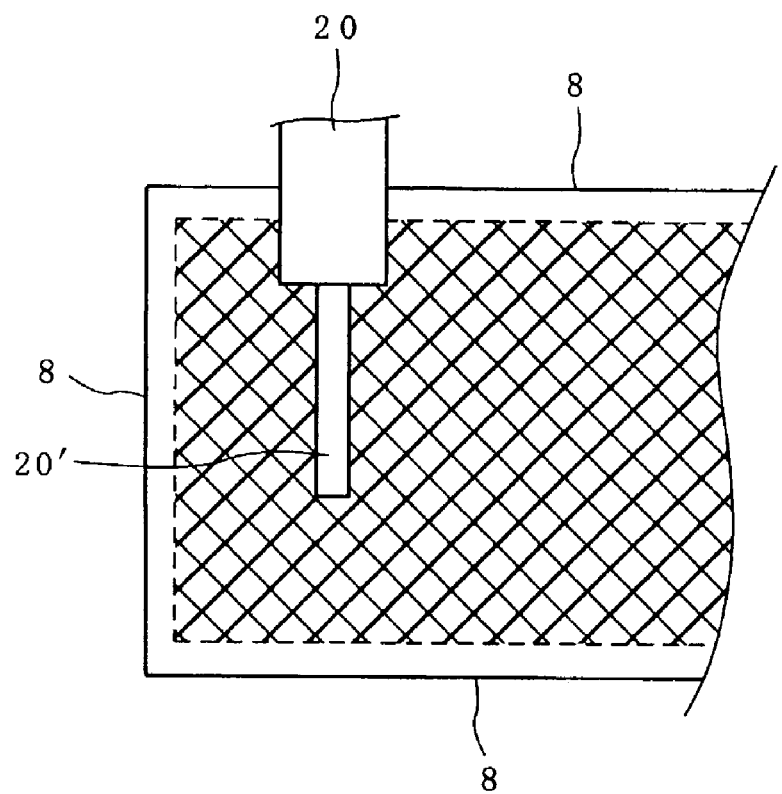
FIGS. 7A and 7B are sectional views of another transmission path according to a second embodiment of the present invention.
Figure 7B:
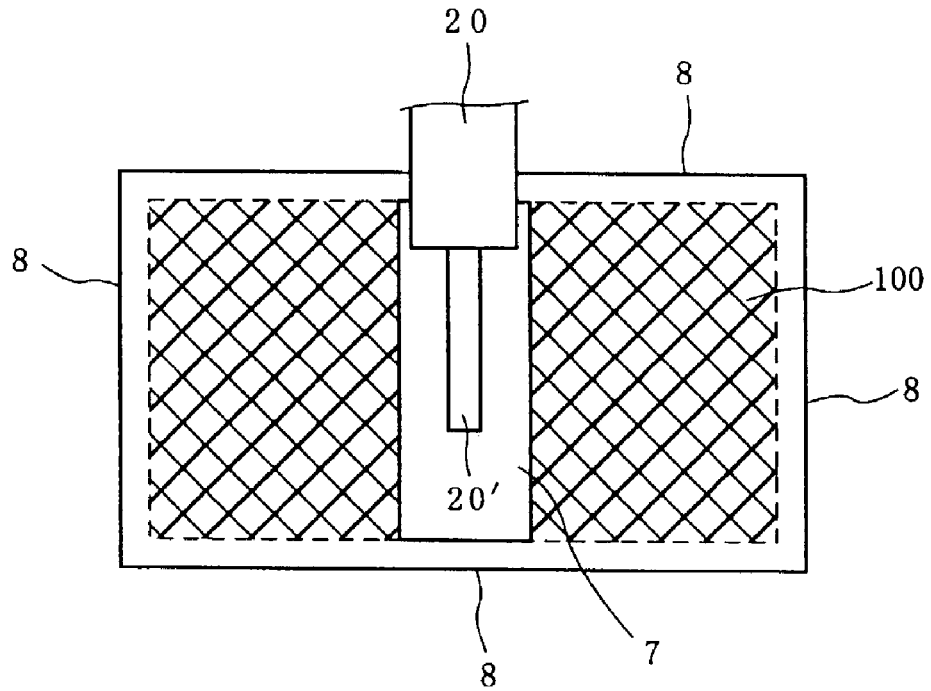

FIGS. 7A and 7B each show another transmission path having a different structure from that shown in FIG. 6. FIG. 7A is a longitudinal cross-section taken along the signal transmission direction. FIG. 7B is a longitudinal cross-section taken in a plane orthogonal to the signal transmission direction. A probe 20 and a central conductor 20' thereof are shown. In this example, a void 7 extending in the vertical direction or the signal transmission direction is formed at a center of the three-dimensional periodic structure component 100 as shown in FIG. 7B. The central conductor 20' of the probe is inserted into void 7. The void 7 acts as a cavity waveguide. The surrounding three-dimensional structure component 100 blocks predetermined unwanted frequencies. Therefore, signals in the frequency band to be transmitted are concentrated in the void 7. Thus, the void 7 acts as the cavity waveguide.

In the embodiments shown in FIGS. 67A and 7B, the three-dimensional space is filled with the void(s) of a predetermined size. Similarly, the three-dimensional space may be filled with a dielectric in a predetermined size.

With such a structure, a transmission path having a filter function with decreased loss can be provided.

Figure 8A:
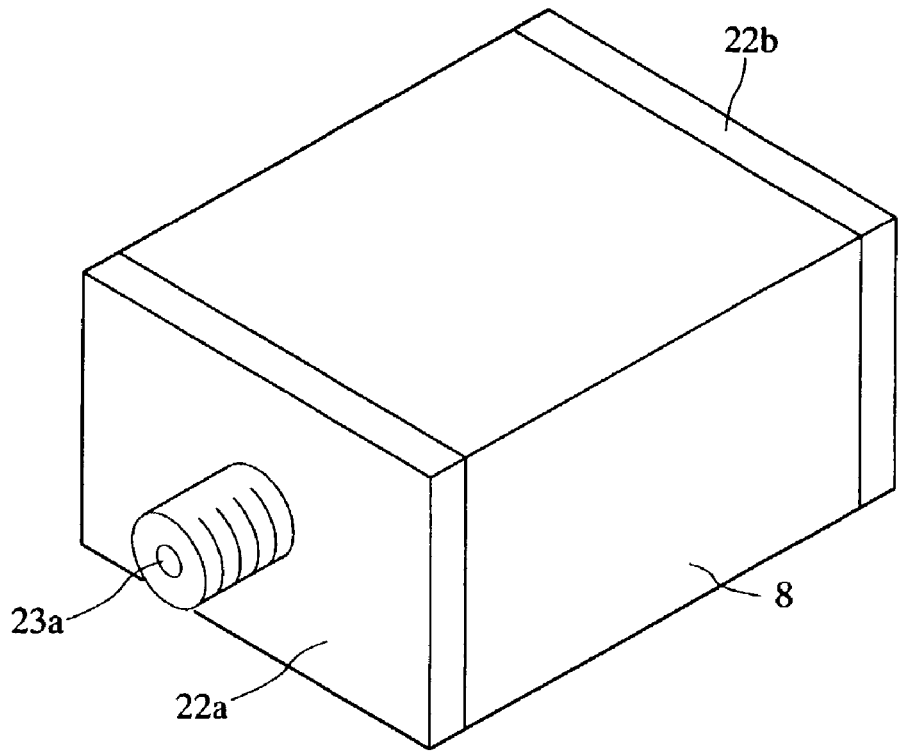
FIGS. 8A and 8B are a perspective view and a sectional view of a filter according to a third embodiment of the present invention.
Figure 8B:
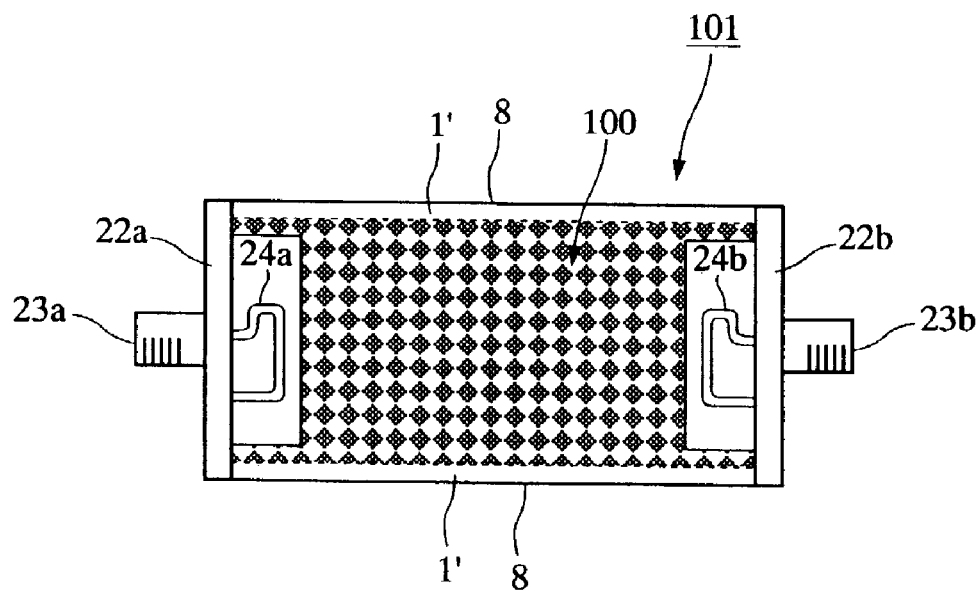

Referring to FIGS. 8A and 8B, a filter according to a third embodiment of the present invention will be described.

FIGS. 8A and 8B are a perspective view and a sectional view of the filter. An external conductor 8 of the three-dimensional periodic structure is shown. Two openings are covered by panels 22a and 22b. Connection loops 24a and 24b that are connected to coaxial connectors 23a and 23b and a center conductor are formed on the panels 22a and 22b. The three-dimensional periodic structure 101 may be any structure shown in the first or second embodiment except that spaces for inserting the connection loops 24a and 24b are formed in advance at end faces of the three-dimensional periodic structure 101.

Basically, the three-dimensional periodic structure 101 functions as a cavity resonator or a cavity waveguide. Since the three-dimensional periodic structure component 100 exists, frequencies corresponding to the photonic band gap are attenuated. By tuning a resonance frequency in a spurious mode with the frequency attenuated, the filter functions as a band rejection filter that rejects the frequency band of the attenuated frequency.

Figure 9:
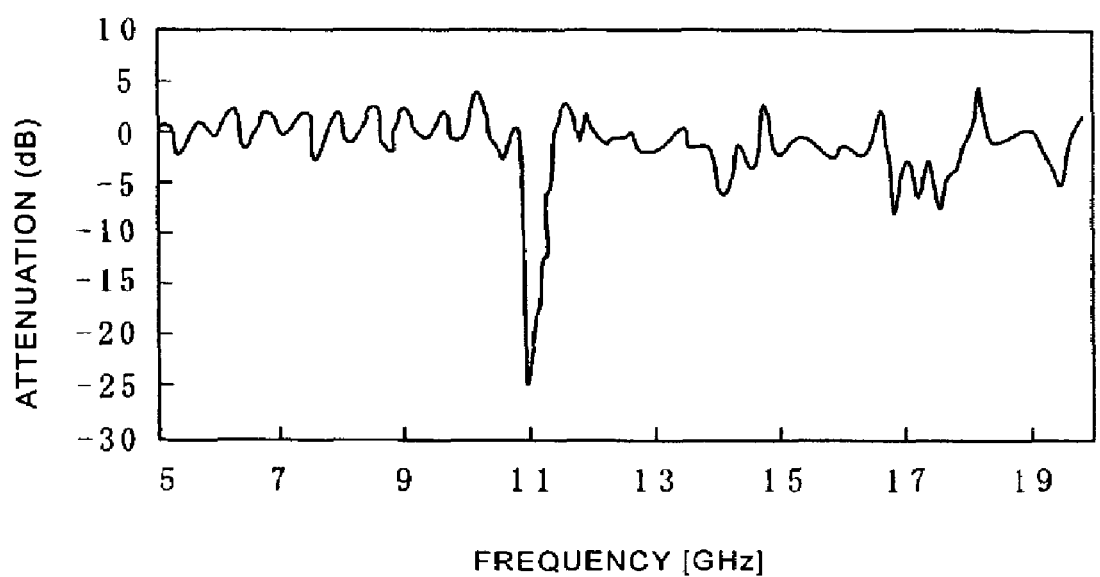
FIG. 9 is a graph showing characteristics of the filter.

FIG. 9 shows penetration characteristics of the filter. In this embodiment, the filter functions as a band rejection filter for attenuating a frequency band of 11 GHz.

Figure 10A:
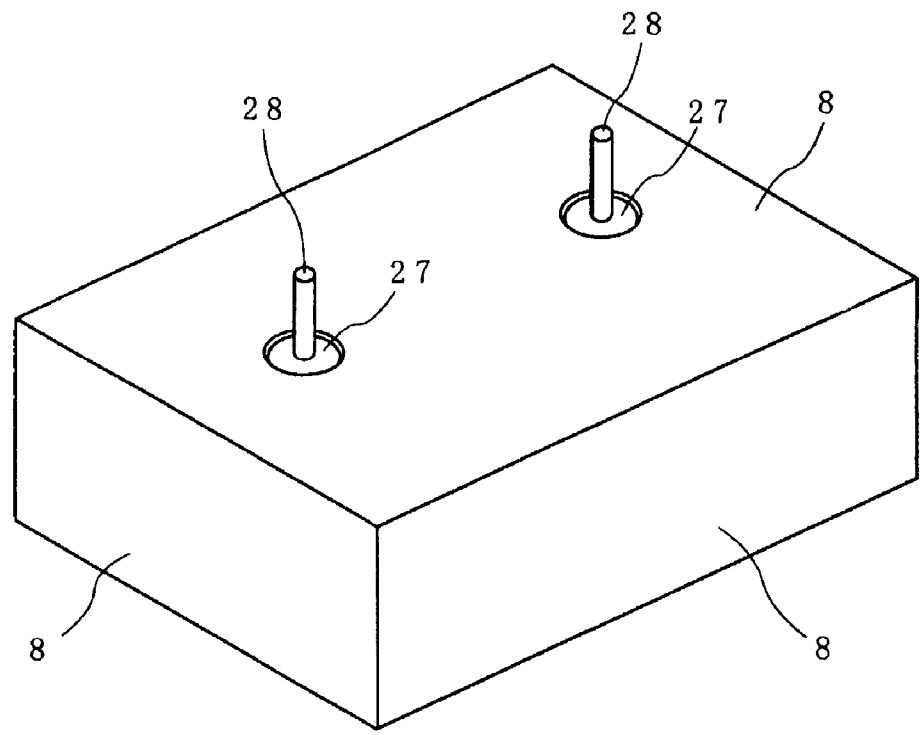
FIGS. 10A to 10C are a perspective view and sectional views each showing a filter according to a fourth embodiment of the present invention.
Figure 10B:
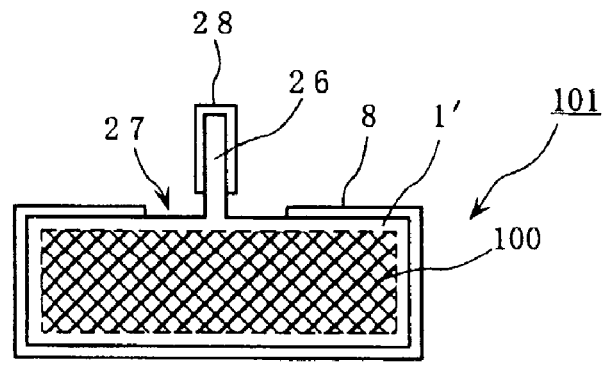
Figure 10C:
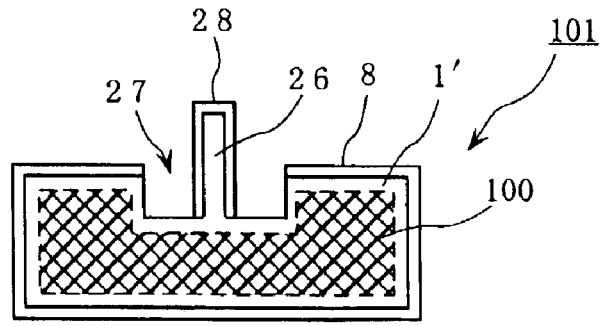

Referring to FIGS. 10A to 10C, a filter according to a fourth embodiment of the present invention will be described.

FIG. 10A is a perspective view of the filter. FIG. 10B is a sectional view showing a main part thereof. FIG. 10C is a sectional view showing another filter. A three-dimensional periodic structure component 100 is shown. On an external surface of the structure, a dielectric layer 1' and protrusions 26 are formed. The protrusions 26 are formed of a dielectric which is continuous with the dielectric layer 1'. An external conductor 8 is formed on external surfaces of the dielectric layer 1'. Windows 27 having no external conductor 8 are formed at the bottom of the protrusions 26. Electrodes 28 are formed on the surfaces of the protrusions 26. The electrodes 28 are insulated from the external conductor 8 by the windows 27.

In such a structure, the external conductor 8 disposed around the three-dimensional periodic structure 101 acts as a cavity of a cavity resonator, the windows 27 act as windows for external connection, and the electrodes 28 on the surfaces of the protrusions 26 act as probes. Thus, a filter integrally having external input and output parts (probes) can be formed by forming a conductor (electrode) film on the three-dimensional periodic structure formed by stereolithography.

In FIG. 10C, the windows 27 are recessed, and the bottom of the protrusions 26 is lower than the top surface of the external conductor 8. Accordingly, the electrodes 28 around the protrusions 26 are partly inserted into resonant space.

With such a structure, the electrodes 28 functioning as the probes can be strongly connected to the resonator.

Figure 11:
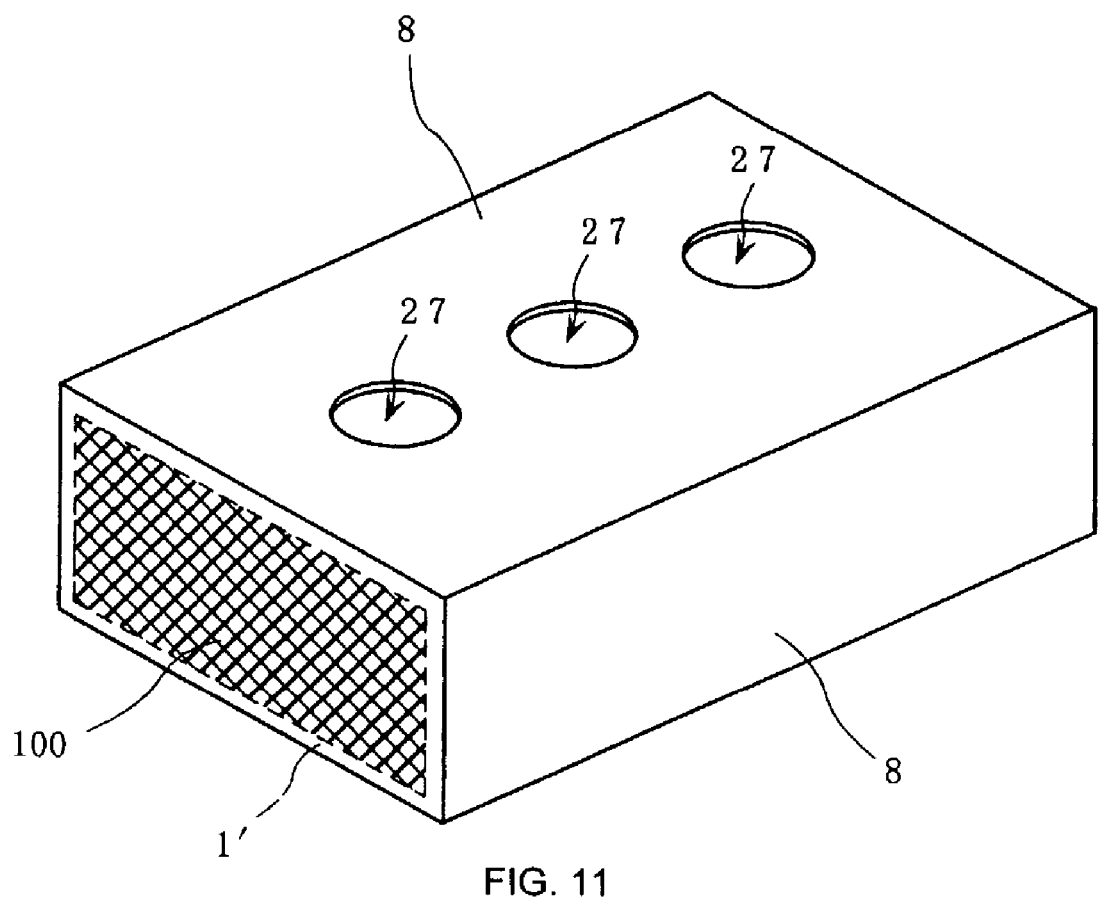
FIG. 11 is a perspective view of a transmission path according to a fifth embodiment of the present invention.

Referring to FIG. 11, an antenna according to a fifth embodiment of the present invention will be described.

FIG. 11 is a perspective view of an antenna. A three-dimensional periodic structure component 100 is shown. A dielectric layer 1' having a predetermined thickness is formed around component 100. An external conductor 8 is formed on four sides of the dielectric layer 1'. A plurality of windows 27 are arranged and formed in part of the external conductor 8. The external conductor 8 acts as a waveguide. The windows 27 act as windows for electromagnetic waves. The electromagnetic waves transmitted through the waveguide are radiated from the windows 27.

By utilizing attenuation characteristics of a predetermined frequency of the three-dimensional periodic structure 101, the transmission or reception of unwanted frequency components can be prevented.

The windows 27 may have a slot-like shape to construct a so-called slot antenna.

Figure 12:
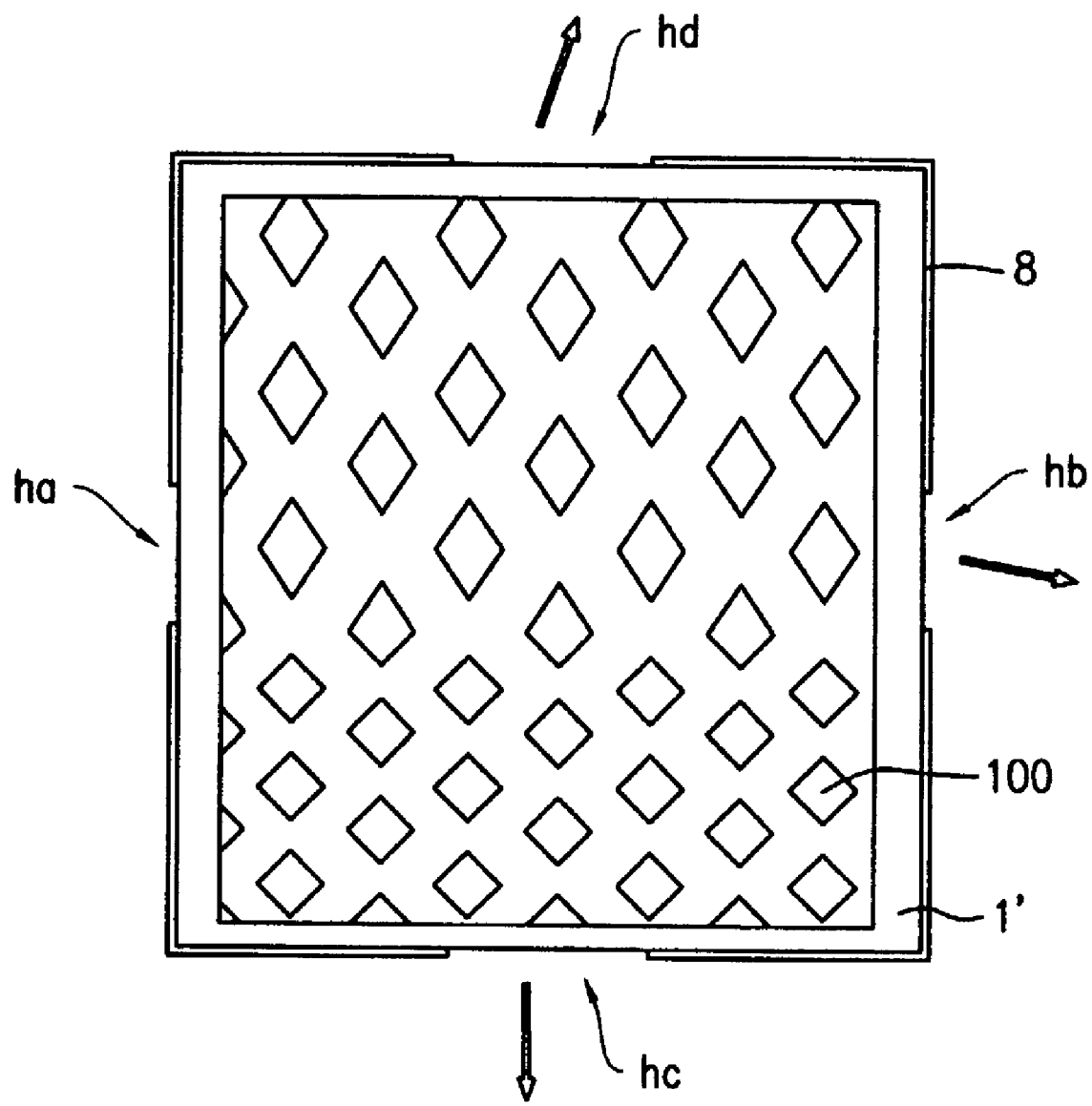
FIG. 12 is a sectional view of an antenna according to a sixth embodiment of the present invention.

Referring to FIG. 12, an antenna according to a sixth embodiment of the present invention will be described.

FIG. 12 is a sectional view orthogonal to the signal transmission direction. A three-dimensional periodic structure component 100 is shown. A dielectric layer 1' having a predetermined thickness is formed around component 100. An external conductor 8 is formed on a surface of the dielectric layer 1'. The three-dimensional periodic structure component 100 is configured so that the crystal period is gradually changed in a predetermined direction (the vertical direction in FIG. 12), unlike the antenna shown in FIG. 11. Windows ha, hb, hc, and hd are disposed on the external conductor 8. The four sides thereof have the windows ha to hd, unlike the antenna shown in FIG. 11.

Thus, the crystal period of the three-dimensional periodic structure component 100 is gradually changed along a predetermined axis direction, whereby directivity can be changed corresponding to the frequency. The windows are disposed on plural sides, whereby the signals in different frequency bands can be radiated in a predetermined direction.

The three-dimensional periodic structure component 100 has a crystal period that gradually changes along the predetermined axial direction. Accordingly, the photonic band gap differs depending on the transmission direction of electromagnetic waves. As a result, there is provided different directivity depending on the frequency.

Figure 13:
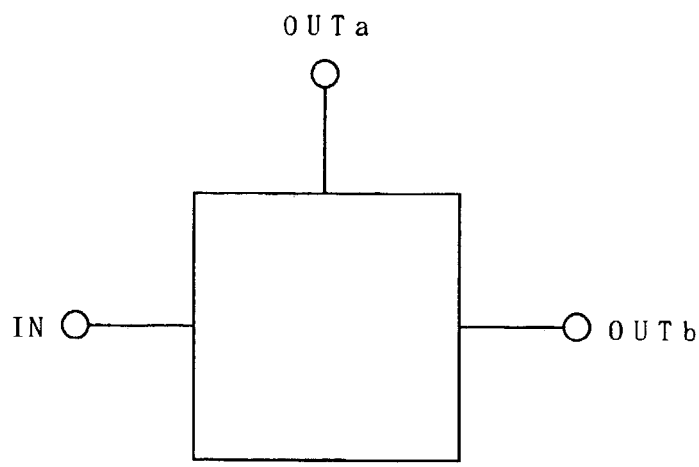
FIG. 13 is a block diagram of a branching filter according to a seventh embodiment of the present invention.

Referring to FIG. 13, a branching filter according to a seventh embodiment of the present invention will be described.

In the embodiment shown in FIG. 12, the electromagnetic waves are radiated from the windows ha to hd disposed on the external conductor 8. Frequency characteristics of the radiant efficiency in each window are determined by the crystal period of the three-dimensional periodic structure component 100 and the position of each window. In other words, the electromagnetic waves can be selectively radiated from each window depending on their frequency. Accordingly, a transmission path for transmitting the electromagnetic waves radiated from the windows shown in FIG. 12 is provided, which can be used as a branching filter. FIG. 13 shows a block diagram thereof. In this embodiment, the windows are disposed at three sides of the three-dimensional periodic structure. The electromagnetic waves are inputted to one of the windows, and outputted from the remaining two windows.

Figure 14:
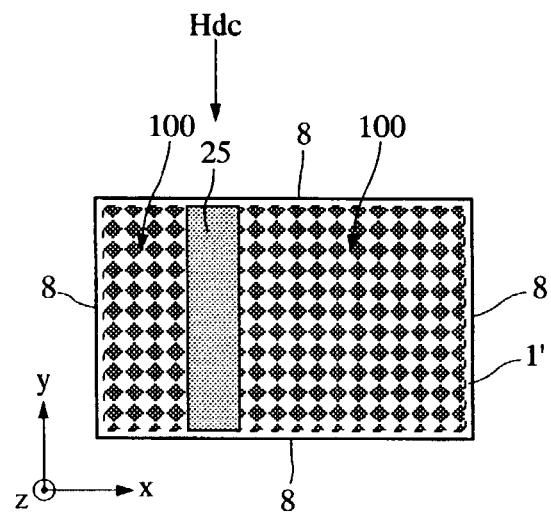
FIG. 14 shows the construction of an isolator according to an eighth embodiment of the present invention.

Referring to FIG. 14, an isolator according to an eighth embodiment of the present invention will be described.

FIG. 14 is a sectional view orthogonal to the signal transmission direction. In the isolator, a dielectric layer 1' having a predetermined thickness is shown disposed around the periphery of a three-dimensional periodic structure component 100. An external conductor 8 is coated and formed around component 100. The thus-constructed three-dimensional periodic structure acts as a rectangular waveguide. A ferrite plate 25 is inserted into the rectangular waveguide at an asymmetric position with respect to the center of the external conductor 8. A direct current magnetic field Hdc is applied from outside the ferrite plate 25. In the TE10 mode in rectangular waveguide, there exists vibration magnetic fields Hx and Hz that differ in phase by 90°, and the combined rotating magnetic field is elliptically polarized in the y-z plane at optional one point. The rotation direction of the polarized wave is opposite on both sides of the y-z plane including the tube axis. A wave propagating in the positive z direction is also opposite to a wave propagating in the negative z direction. By appropriately selecting the direct current magnetic field Hdc, the wave propagating in the positive z direction produces a positive rotating magnetic field and is attenuated by resonance absorption. The wave propagating in the negative z direction is not attenuated. Thus, the structure functions as an isolator. In this case, the three-dimensional periodic structure component 100 is provided, whereby unwanted frequency bands transmitted through the waveguide are attenuated. The isolator can be used as an isolator having a filter function.

The three-dimensional periodic structure component 100 sandwiching the ferrite 25 can be produced separately. Alternatively, the ferrite 25 may be embedded into a single three-dimensional periodic structure component 100, and they may be integrated to form a three-dimensional periodic structure.

Figure 15:
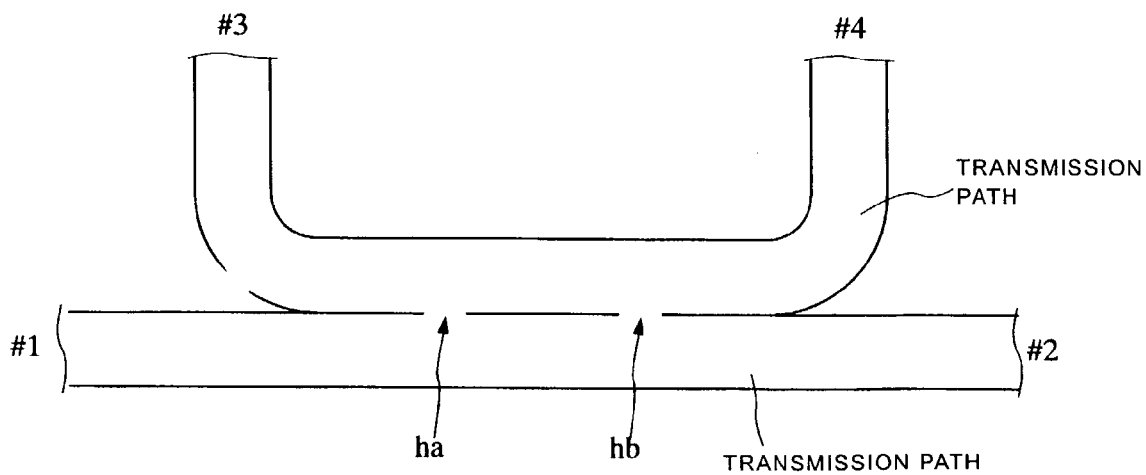
FIG. 15 shows the construction of a coupler according to a ninth embodiment of the present invention.

Referring to FIG. 15, a coupler according to a ninth embodiment of the present invention will be described.

In the coupler, two transmission paths are aligned, and connection elements for connecting waves in both transmission paths are provided on walls of the transmission paths. In this embodiment, holes ha and hb are provided as the connecting waves, separated by ¼ of the wavelength in the waveguide. Signals transmitted from a port #1 to a port #2 are added in-phase at port #4 and outputted, but are added in negative-phase at port #3, so that they cancel and are not outputted.

The two transmission paths may be any structure shown in the first or second embodiment. The coupler transmits the frequency bands to be transmitted, and acts as a filter for blocking unwanted frequency bands.

Figure 16:
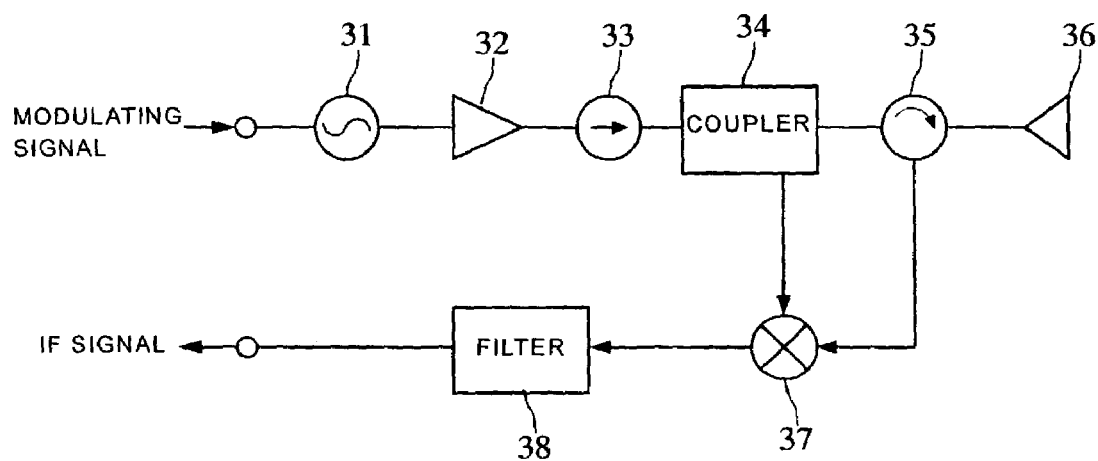
FIG. 16 shows the construction of a radar according to a tenth embodiment of the present invention.

Referring to FIG. 16, a radar according to a tenth embodiment of the present invention will be described.

In FIG. 16, an oscillator 31, an amplifier 32 for amplifying oscillated signals, an isolator 33 for preventing the signals from returning to the amplifier 32, and a coupler 34 for taking out a part of the signals transmitted as local signals are shown. Also, an antenna 36, a mixer 37, and a circulator 35, which outputs the signals transmitted to the antenna 36 and outputs the signals received from the antenna 36 to the mixer 37, are shown. The mixer 37 mixes the received signals with the local signals to produce beat signals. A filter 38 takes necessary frequency components of the beat signals, and outputs them as received intermediate frequency (IF) signals.

The isolator 33 is shown in FIG. 14. The coupler 34 is shown in FIG. 15. The antenna 36 is shown in FIG. 11 or 12.

The individual transmission paths are shown in FIGS. 2, 6 and 7. Thus, a compact and high sensitivity radar having low spurious characteristics is constructed by using the high frequency element with a filtering function.

Figure 17:
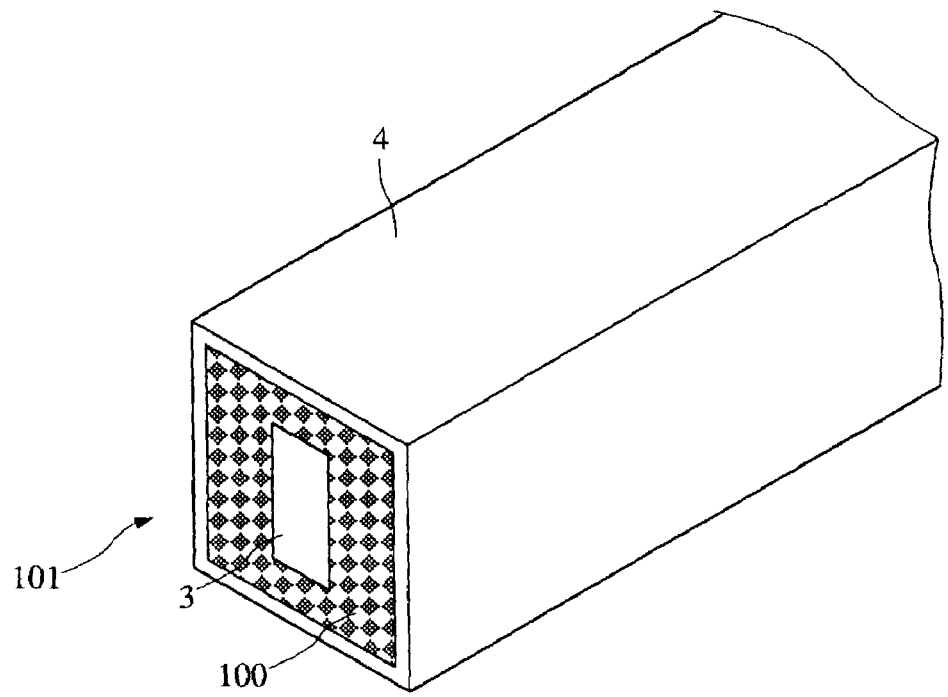
FIG. 17 is a perspective view of a transmission path according to an eleventh embodiment of the present invention.
Figure 18:
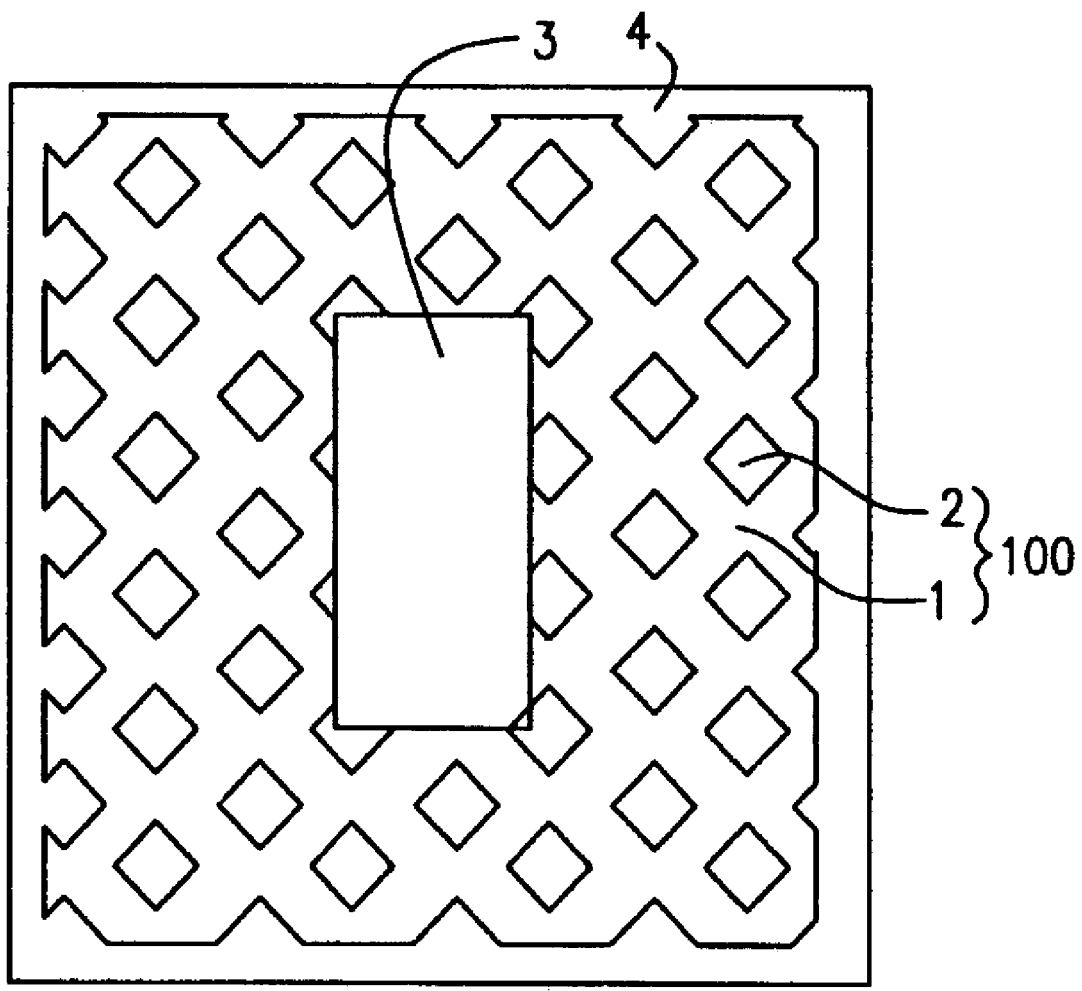
FIG. 18 is a sectional view of the transmission path.

Referring to FIGS. 17 to 19, a three-dimensional periodic structure, a method of producing the same, and a transmission path according to an eleventh embodiment of the present invention will be described.

FIG. 17 is a perspective view showing a transmission path. FIG. 18 is a sectional view thereof. A waveguide 4 is shown. A three-dimensional periodic structure 101 is provided within the waveguide 4. In FIG. 17, a dielectric 1, which is formed of one substance of a three-dimensional periodic structure component 100, and air holes 2, which is the other substance, are shown. The dielectric 1 and the air holes 2 together constitute the three-dimensional structure component 100. A rectangular dielectric 3 extends along the signal transmission direction of the waveguide 4. The three-dimensional periodic structure component 100 and the rectangular dielectric 3 together constitute the three-dimensional periodic structure 101.

The three-dimensional periodic structure component 100 acts as a photonic crystal. In order for the photonic crystal to develop a sufficient electromagnetic-wave reflectivity, it is necessary to form a wide band gap in all crystal directions. An ideal crystal structure is a three-dimensional diamond structure. In the diamond structure, the unit lattice includes eight lattice points; four of which make an independent face centered cubic lattice, and one lattice is located at a position so that the lattice is moved ¼ of the length of the other lattice along a steric diagonal line.

Figure 3B:
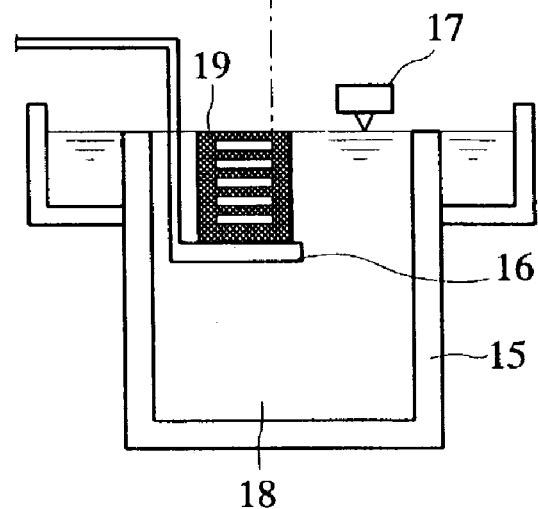
FIGS. 3B is a sectional view showing a light-hardening resin irradiated with a laser beam.
Figure 3B:
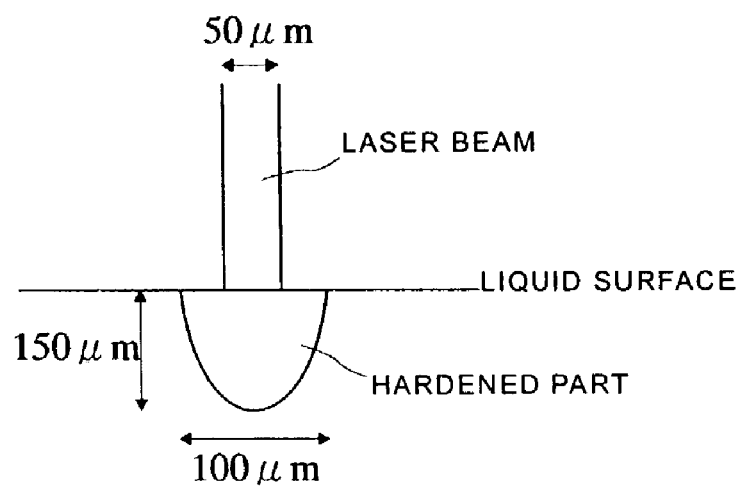
Figure 19A:
FIGS. 19A to 19D show stages in the process for producing a three-dimensional periodic structure by stereolithography.
Figure 19B:
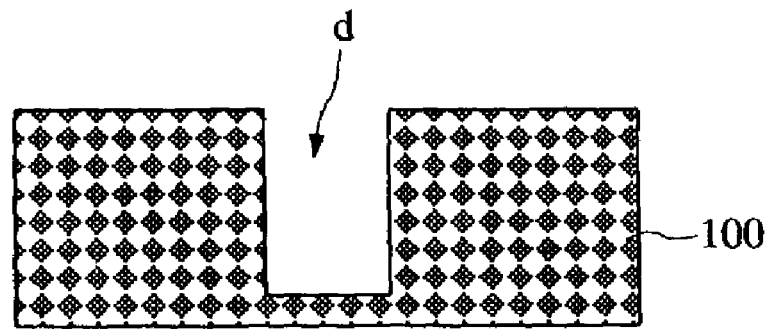
Figure 19C:
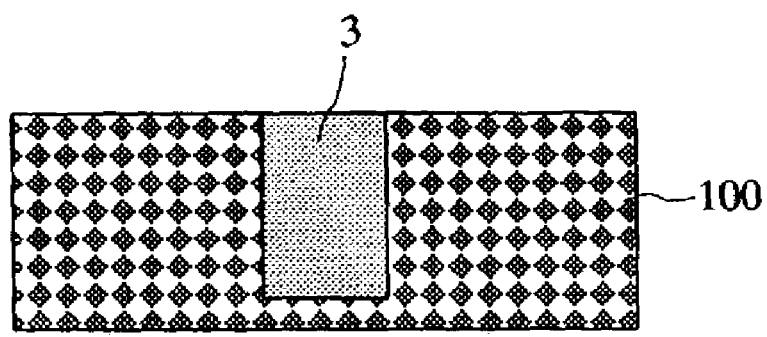
Figure 19D:
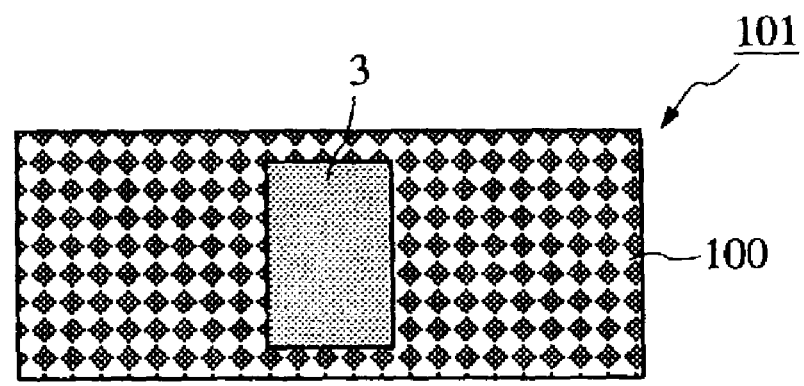

The eleventh embodiment can be produced as described in connection with FIGS. 3 to 5. FIGS. 19A to 19D show stages of the production of a three-dimensional periodic structure by the aforementioned stereolithography apparatus. As shown in FIG. 19A, a three-dimensional periodic structure component 100 is formed by stereolithography so that it has a predetermined thickness. Then, the three-dimensional periodic structure component 100 is further formed by stereolithography to provide a groove d as shown in FIG. 19B. A pre-formed rectangular dielectric 3 is inserted into the groove as shown in FIG. 19C. The three-dimensional periodic structure component 100 is then formed over the dielectric 3, thereby providing a three-dimensional periodic structure 101 where the dielectric 3 is embedded into the three-dimensional periodic structure component 100, as shown in FIG. 19D.

The three-dimensional periodic structure 101 thus formed is disposed within the waveguide 4. This waveguide 4 can provide a transmission path showing penetration characteristics such that a predetermined frequency is significantly attenuated by the photonic band gap of the three-dimensional periodic structure component 100.

In addition, the electromagnetic field in a predetermined transmission mode is converged on the rectangular dielectric 3 at the center of the waveguide 4, and the whole transmission path acts as a dielectric line.

The transmission of the dielectric line can be made to correspond with a signal frequency band to be transmitted, while at the same time, a frequency range attenuated by the three-dimensional periodic structure component 100 is made to correspond with a frequency band to be blocked. As a result, a transmission path having a filter function that transmits only signal components of the frequency band to be transmitted can be provided.

Figure 20:
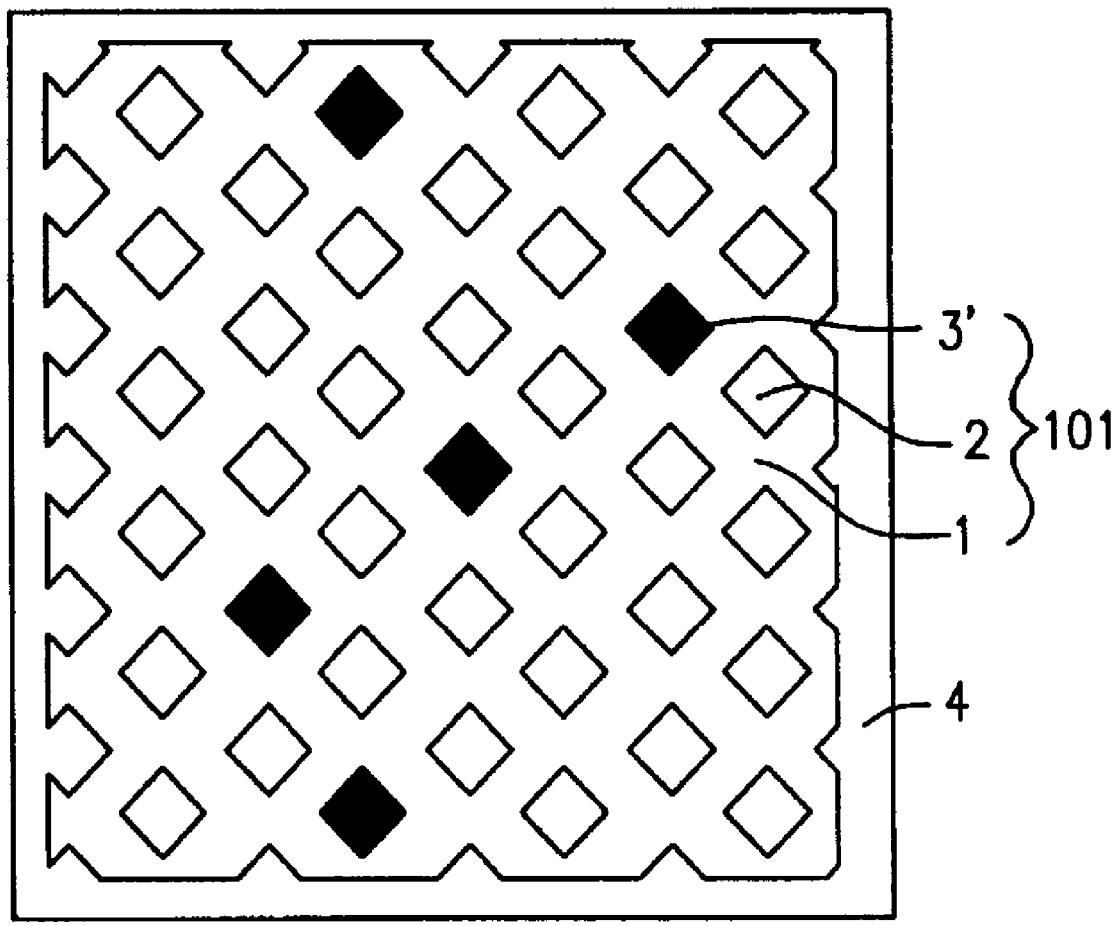
FIG. 20 is a sectional view of a transmission path according to a twelfth embodiment of the present invention.

Referring to FIG. 20, a transmission path according to a twelfth embodiment of the present invention will be described.

FIG. 20 is a sectional view of the transmission path. A dielectric 1 and air holes 2 are shown. The dielectric 1 and the air holes 2 together constitute a three-dimensional periodic structure. Dielectric pieces 3' are embedded into predetermined air holes 2. A three-dimensional periodic structure 101 including the dielectric 1, the air holes 2, and the dielectric pieces 3' is disposed within the waveguide 4.

The three-dimensional periodic structure 101 is produced by repeating the step of forming the dielectric 1 and the air holes 2 by stereolithography, and the step of placing the dielectric pieces 3', each having a size that fits the air holes, into the air holes using the stereolithography apparatus shown in FIG. 3A.

By distributing the dielectric pieces 3', which are made of a different material from that of the dielectric 1, in the lattice of the three-dimensional periodic structure, the three-dimensional periodic structure 101 can have transmission and blocking characteristics in different frequency bands depending on the distribution of the dielectric pieces 3'.

A conductor film may be formed on the surfaces of the dielectric pieces 3'. Alternatively, any conductive material, such as metal, may be distributed instead of the dielectric material, whereby the penetration characteristics of the transmission path can be determined depending on their distribution.

Figure 21:
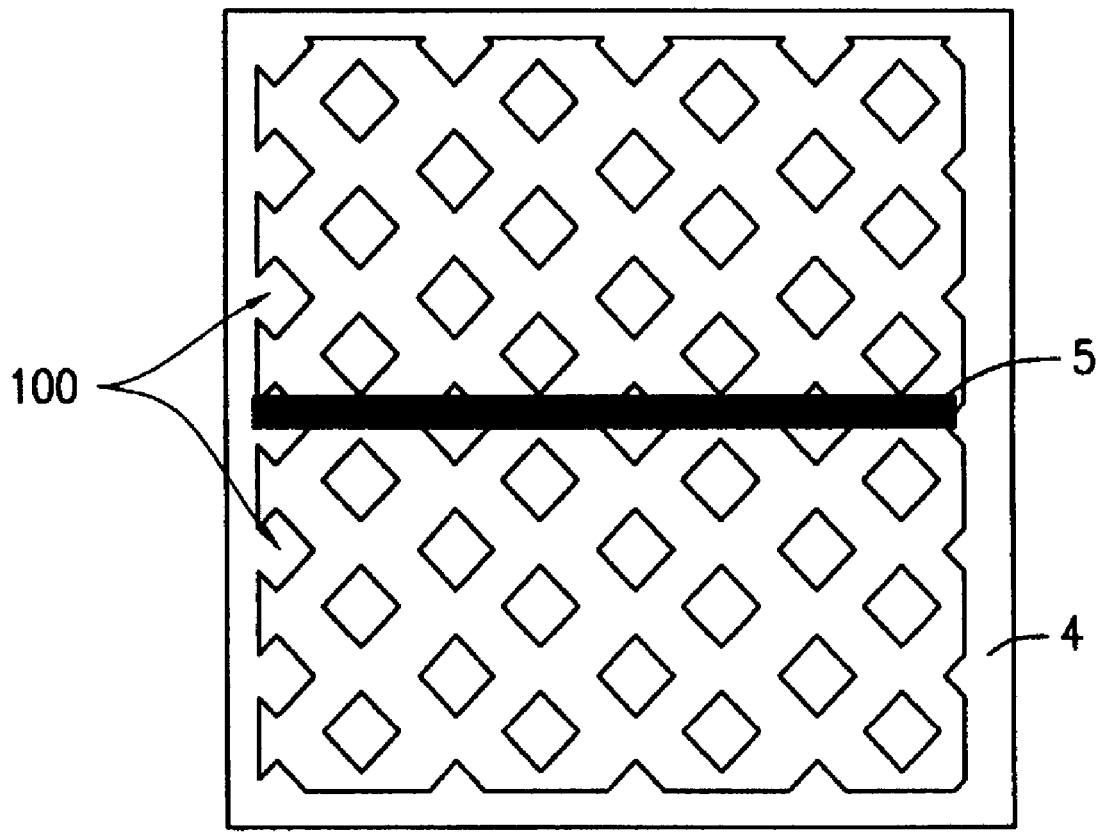
FIG. 21 is a sectional view of a transmission path according to a thirteenth embodiment of the present invention.
Figure 22:
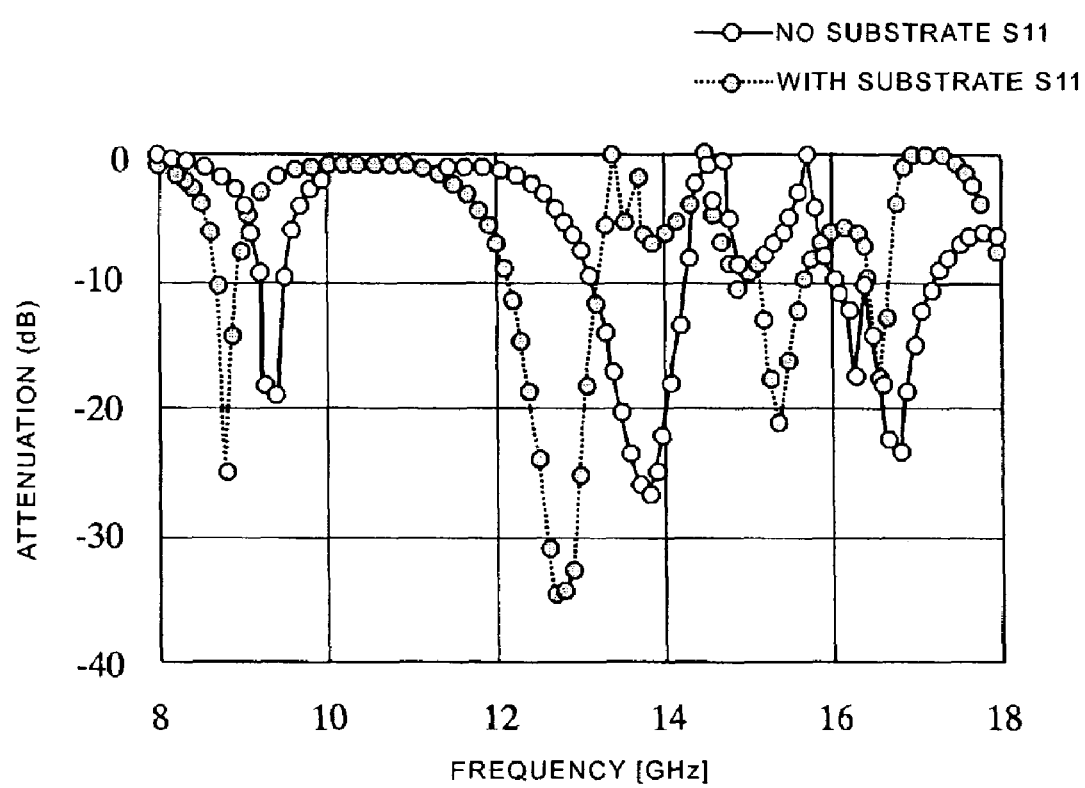
FIG. 22 is a graph showing penetration characteristics of the transmission path.

Referring to FIGS. 21 and 22, a transmission path according to a thirteenth embodiment of the present invention will be described. FIG. 21 is a sectional view of the transmission path. A substrate 5 and a three-dimensional periodic structure component 100 are disposed so that the substrate is sandwiched in the component as shown. The substrate 5 has a higher dielectric constant than the two substances in the three-dimensional periodic structure component 100. The three-dimensional periodic structure comprising the substrate 5 and the three-dimensional periodic structure component 100 are disposed within a waveguide 4.

In FIG. 21, the three-dimensional periodic structure component 100 has the same structures as those of the three-dimensional periodic structure components 100 in the first and second embodiments. The substrate 5 is a dielectric ceramic substrate or a resin substrate. The three-dimensional periodic structures 100 are independently disposed to sandwich the substrate 5. Alternatively, the substrate 5 may be embedded into a single three-dimensional periodic structure component.

FIG. 22 shows penetration characteristics of the transmission path with and without the substrate 5. By disposing a substrate 5 having a higher effective dielectric constant than that of the three-dimensional periodic structure component 100, the blocking frequency band is shifted to lower frequencies, and the attenuation is increased. This is because the substrate has the higher effective dielectric constant, and the blocking conditions change according to the shape and size of the substrate.

Figure 23A:
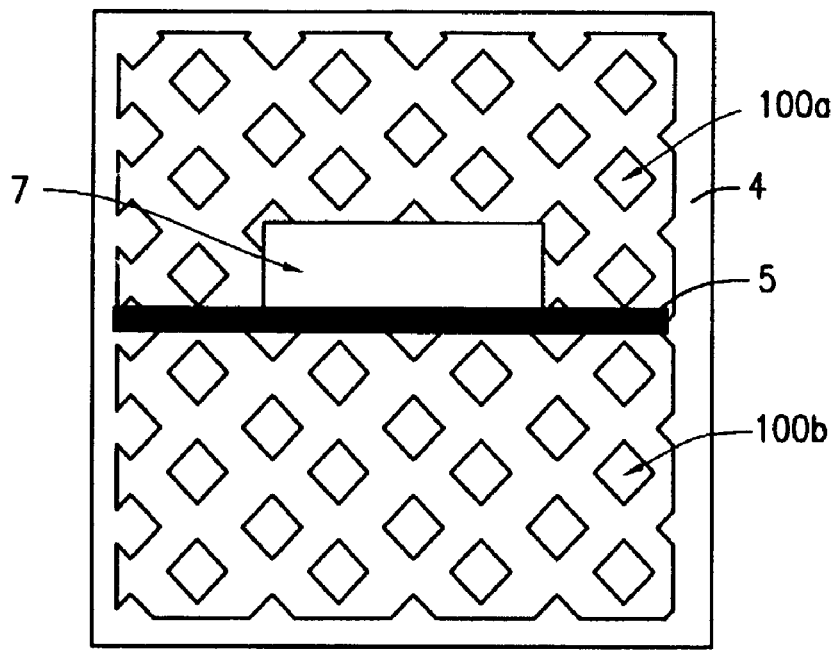
FIGS. 23A and 23B are sectional views each showing a transmission path according to a fourteenth embodiment of the present invention.
Figure 23B:
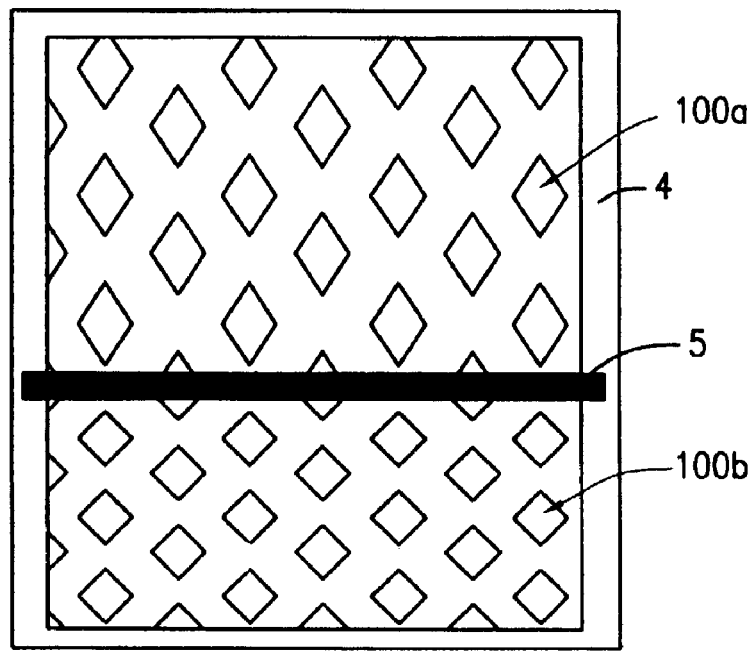

Referring to FIGS. 23A and 23B, a transmission path according to a fourteenth embodiment of the present invention will be described.

FIGS. 23A and 23B are sectional views each showing a transmission path. Three-dimensional periodic structures each comprise a substrate 5 and three-dimensional periodic structure components 100a and 100b are disposed within a waveguide 4 similar to that shown in FIG. 21.

In FIG. 23A, a void 7 extending in the signal transmission direction is disposed in the three-dimensional periodic structure component 100a. In FIG. 23B, the three-dimensional structure components 100a and 100b have different three-dimensional periods in predetermined axial directions. Thus, the waveguide can have different blocking characteristics in frequency bands at different sites of the waveguide. The electrical characteristics of the whole waveguide can be determined freely, as compared with the case where a uniform three-dimensional periodic structure is present.

The three-dimensional periodic structure components 100a and 100b may have a periodic shifting structure where the frequency is sequentially changed along a predetermined axis.

Figure 24:
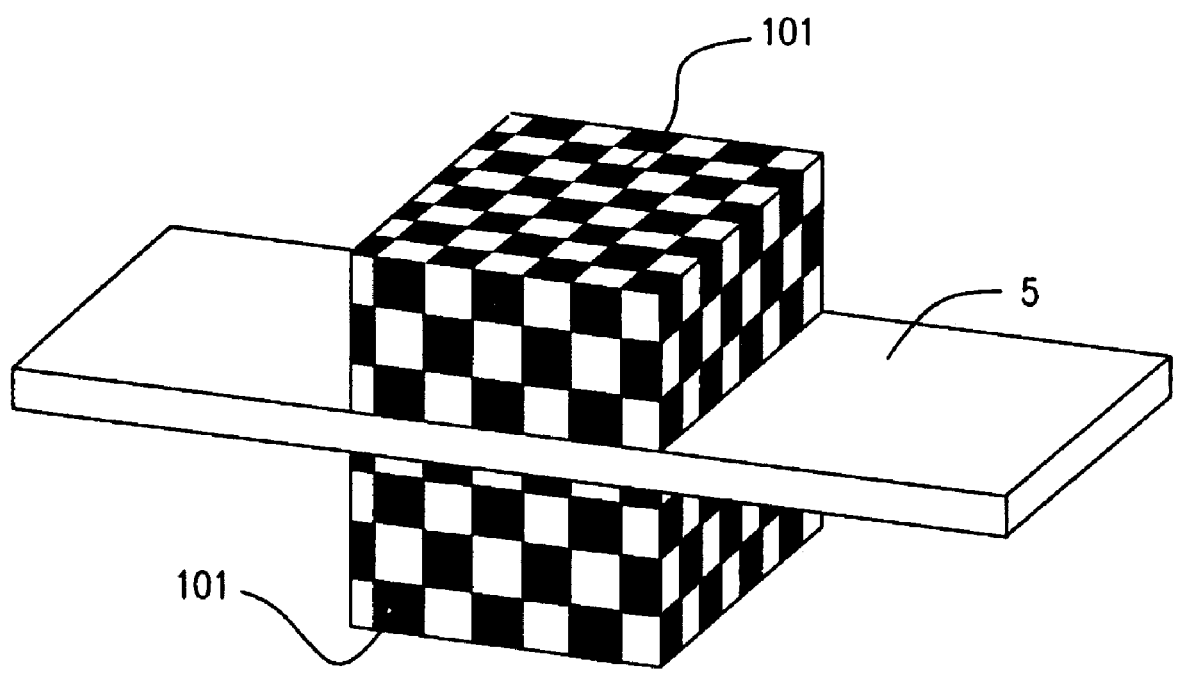
FIG. 24 is a perspective view of a transmission path according to a fifteenth embodiment of the present invention.
Figure 25:
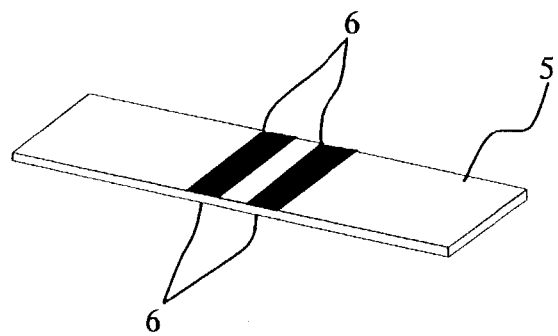
FIG. 25 is a perspective view of a substrate used for the transmission path.
Figure 26:
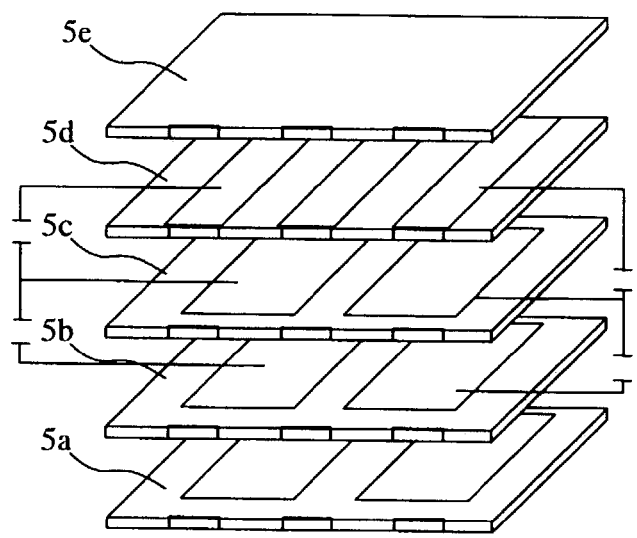
FIG. 26 is an exploded perspective view showing another construction of a substrate.

Referring to FIGS. 24 to 26, a transmission path according to a fifteenth embodiment of the present invention will be described.

FIG. 24 is a perspective view of a transmission path having a predetermined length in the signal transmission direction; the transmission path is cut at a surface orthogonal to the signal transmission direction. In FIG. 24, a substrate 5 constituting a main part of the transmission path is shown. Three-dimensional periodic structures 101 are disposed above and below the main part of the substrate 5. That is, the three-dimensional periodic structures 101 sandwich the substrate 5.

FIG. 25 is a perspective view where the three-dimensional periodic structures 101 are removed from the configuration shown in FIG. 20. Above and below of the substrate 5, electrodes 6 extending in the signal transmission direction are formed. The substrate 5 and the electrodes 6 formed thereon constitute various transmission lines, such as strip lines, slot lines and coplanar lines. Alternatively, a block may be disposed around the substrate to constitute a suspended line.

FIG. 26 is an exploded perspective view showing another construction of a substrate. While the transmission line is constituted by forming the electrodes 6 on a single dielectric substrate in FIG. 25, a multilayer substrate including five layers 5a to 5e is shown in FIG. 26. Layer 5a includes a coil-patterned electrode, layer 5b includes a capacitor-patterned electrode, layer 5c includes a block pattern and layer 5d includes a trimmer electrode. An interlayer connection conductor is formed at a cross-section of or inside the substrate using the so-called LTCC technology. Thus, a multilayer substrate including a circuit element such as a capacitor, an inductor and the interlayer connection conductor may be used, whereby the electrical characteristics of the substrate and the blocking characteristics of the three-dimensional periodic structure 101 can be provided simultaneously.

Figure 27:
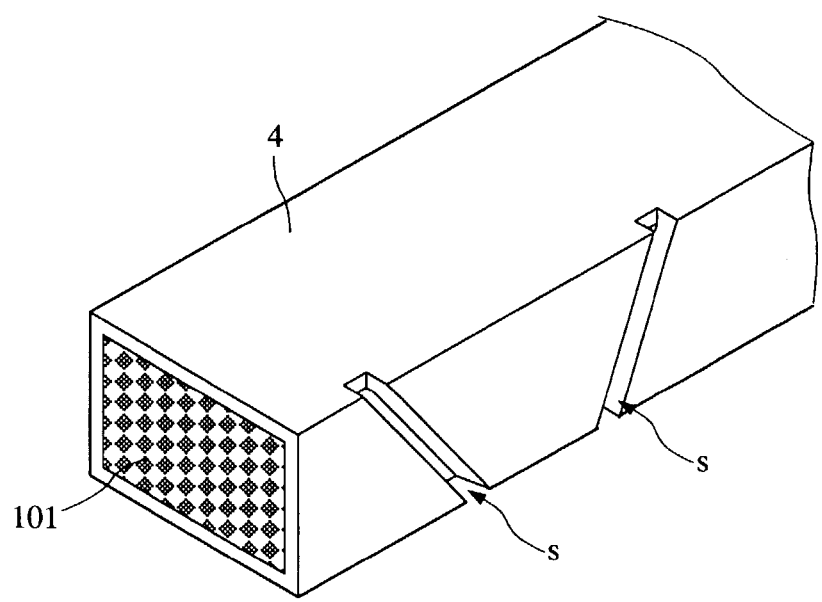
FIG. 27 is a perspective view of a slot antenna using the invention.

FIG. 27 is a perspective view of a slot antenna. The antenna comprises a waveguide 4 and the three-dimensional periodic structure 101 (as earlier described in connection with any one of the embodiments) disposed therein. A plurality of slots s are provided at one side of the waveguide 4. These slots s are excited in-phase, and radiate waves at maximum in a cross direction of the waveguide 4. Since the three-dimensional periodic structure 101 is provided, signals transmitted through the waveguide 4 are attenuated in unwanted frequency bands, resulting in antenna characteristics with less spurious effects/characteristics.

What is claimed is:

1. A three-dimensional periodic structure, comprising;
a first substance having a first dielectric constant, the first substance occupying a three-dimensional space,
a second substance having a second dielectric constant which is different from the first dielectric constant periodically distributed in three-dimensional axial directions in the interior of the three-dimensional space, and
(a) a conductor on an external surface of the three-dimensional space, or
(b) a third substance which is different from the first and second substances embedded in the three-dimensional space, or
(c) both (a) and (b).

2. A three-dimensional periodic structure according to claim 1, wherein the conductor is present and is in the form of a conductive film.

3. A three-dimensional periodic structure according to claim 2, wherein space of predetermined dimensions and filled with one of the two substances is present in the three-dimensional space.

4. A three-dimensional periodic structure according to claim 2, wherein the second substance is air and is arrayed so as to form three-dimensional diamond shaped structures within the three-dimensional space.

5. A three-dimensional periodic structure according to claim 2, wherein the first substance is a dielectric.

6. A three-dimensional periodic structure according to claim 2, wherein the three-dimensional space includes a void space.

7. A three-dimensional periodic structure according to claim 6, wherein the void space contains a dielectric.

8. A three-dimensional periodic structure according to claim 6, wherein the void space contains a ferrite.

9. A three-dimensional periodic structure according to claim 6, wherein the void space extends inwardly from a peripheral surface of the three-dimensional space.

10. A method of producing a three-dimensional periodic structure according to claim 2 by stereolithography, comprising:
layer-by-layer, irradiating light onto a light-hardenable resin in individual layers in cross-sectional pattern to be present in that layer to form a three-dimensional periodic structure, and
forming the conductive film by electroless plating.

11. A three-dimensional periodic structure according to claim 1, wherein the third substance is present.

12. A three-dimensional periodic structure according to claim 11, wherein the second substance is an air and is disposed as a plurality of holes arrayed in the first substance so as to form a three-dimensional diamond shaped crystal lattice structure, and wherein the third substance is disposed in a plurality of the air holes.

13. A three-dimensional periodic structure according to claim 11, wherein the three-dimensional periodic structure has changed periods along predetermined three-dimensional axial directions.

14. A three-dimensional periodic structure according to claim 11 disposed on at least one surface of a substrate which constitutes a part of a transmission path.

15. A three-dimensional periodic structure according to claim 14, wherein the substrate comprises a transmission line comprising a conductive film.

16. A three-dimensional periodic structure according to claim 15, wherein the substrate has a multilayer structure comprising at least one circuit element.

17. A method of producing a three-dimensional periodic structure according to claim 11 by stereolithography, comprising:

layer-by-layer, irradiating light onto a light-hardenable resin in individual layers in cross-sectional pattern to be present in that layer to form the three-dimensional periodic structure, and providing the third substance during the stereolithography.

18. A three-dimensional periodic structure according to claim 1, wherein the three-dimensional periodic structure is in combination with a coupling part that is coupled to an electromagnetic field in a resonance mode in the space surrounded by the conductor of the three-dimensional periodic structure, thereby creating a resonator.

19. A three-dimensional periodic structure according to claim 1, wherein the three-dimensional periodic structure is in combination with a coupling part that is coupled to an electromagnetic field in a transmission mode in the space surrounded by the conductor of the three-dimensional periodic structure, thereby creating a transmission path.

20. A three-dimensional periodic structure according to claim 19, wherein the three-dimensional periodic structure includes windows in the conductor of the three-dimensional periodic structure through which electromagnetic waves penetrate, whereby an antenna is created.

21. A three-dimensional periodic structure according to claim 20, wherein the three-dimensional periodic structure has different crystal periods in predetermined three-dimensional directions, and the windows are provided in the predetermined three-dimensional directions with the different crystal periods.

22. A three-dimensional periodic structure according to claim 20, and a transmission path provided at the window of the antenna, thereby forming a branching filter.

23. A three-dimensional periodic structure according to claim 1, disposed as a signal transmission path of an isolator or a coupler.

24. A high frequency apparatus containing at least one element selected from the group consisting of resonator, transmission path, antenna, branching filter, isolator, and coupler, in which said element comprises a three-dimensional periodic structure according to claim 1.

* * * * *